US012574608B2

(12) United States Patent
Bove, Jr. et al.

(10) Patent No.: US 12,574,608 B2
(45) Date of Patent: Mar. 10, 2026

(54) USER INTERFACE METHOD AND APPARATUS FOR VIDEO NAVIGATION USING CAPTIONS

(71) Applicant: Adeia Guides Inc., San Jose, CA (US)

(72) Inventors: V. Michael Bove, Jr., Wrentham, MA (US); Serhad Doken, Bryn Mawr, PA (US); Ning Xu, Irvine, CA (US); Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/144,907

(22) Filed: May 9, 2023

(65) Prior Publication Data

US 2024/0380948 A1 Nov. 14, 2024

(51) Int. Cl.
| | |
|---|---|
| *H04N 21/488* | (2011.01) |
| *G06F 3/0488* | (2022.01) |
| *G06F 3/16* | (2006.01) |
| *H04N 21/472* | (2011.01) |

(52) U.S. Cl.
CPC ....... H04N 21/4884 (2013.01); G06F 3/0488 (2013.01); G06F 3/16 (2013.01); H04N 21/47217 (2013.01)

(58) Field of Classification Search
None
See application file for complete search history.

(56) References Cited

U.S. PATENT DOCUMENTS

| | | | | | |
|---|---|---|---|---|---|
| 6,061,056 | A * | 5/2000 | Menard | ............. | H04N 21/4826 |
| | | | | | 715/704 |
| 8,479,238 | B2 * | 7/2013 | Chen | ............... | H04N 21/23439 |
| | | | | | 725/86 |
| 8,610,673 | B2 * | 12/2013 | Storrusten | ............ | G06F 3/0482 |
| | | | | | 345/173 |
| 9,681,165 | B1 * | 6/2017 | Gupta | ............. | H04N 21/44008 |
| 10,489,496 | B1 * | 11/2019 | Sen | .................... | H04N 21/4122 |
| 12,216,700 | B2 * | 2/2025 | Taboriskiy | ......... | H04N 21/4722 |
| 2009/0164460 | A1 * | 6/2009 | Jung | ...................... | H04N 21/47 |
| | | | | | 707/999.005 |
| 2010/0262938 | A1 * | 10/2010 | Woods | ............... | H04N 21/4438 |
| | | | | | 715/850 |
| 2011/0282906 | A1 * | 11/2011 | Wong | ................. | G06F 16/7837 |
| | | | | | 707/E17.03 |
| 2014/0068692 | A1 * | 3/2014 | Archibong | ......... | H04N 21/6334 |
| | | | | | 725/116 |
| 2014/0213332 | A1 * | 7/2014 | Otsuka | .................... | A63F 13/30 |
| | | | | | 463/2 |
| 2014/0282660 | A1 * | 9/2014 | Oztaskent | .......... | H04N 21/4725 |
| | | | | | 725/38 |

(Continued)

FOREIGN PATENT DOCUMENTS

CA 2572709 A1 7/2007

*Primary Examiner* — An Son P Huynh
(74) *Attorney, Agent, or Firm* — HG Law LLP

(57) ABSTRACT

Systems and methods for navigating a video via interaction with text overlaid on the video are described. In one example, a method includes generating for display a video, and generating for display at least one line of text overlaid over the video. Then, in response to receiving a directional user interface input for at least a portion of the at least one line of text, the method includes modifying a play position of the video based on a direction of the directional user interface input for the at least a portion of the at least one line of text.

17 Claims, 13 Drawing Sheets

(56)　　　　References Cited

U.S. PATENT DOCUMENTS

| | | | | |
|---|---|---|---|---|
| 2014/0365882 | A1* | 12/2014 | Lemay | G06F 3/016 |
| | | | | 715/256 |
| 2015/0016801 | A1* | 1/2015 | Homma | G11B 27/19 |
| | | | | 386/243 |
| 2015/0256763 | A1* | 9/2015 | Niemi | H04N 5/2625 |
| | | | | 348/700 |
| 2015/0309686 | A1* | 10/2015 | Morin | G06F 3/0488 |
| | | | | 715/720 |
| 2015/0382047 | A1* | 12/2015 | Van Os | H04N 21/42222 |
| | | | | 725/38 |
| 2016/0094875 | A1* | 3/2016 | Peterson | H04N 21/4312 |
| | | | | 725/41 |
| 2016/0295294 | A1* | 10/2016 | Lan | H04N 21/845 |
| 2017/0072301 | A1* | 3/2017 | Abecassis | A63F 9/183 |
| 2017/0091153 | A1* | 3/2017 | Thimbleby | G06F 3/04845 |
| 2018/0025078 | A1* | 1/2018 | Quennesson | H04N 21/4788 |
| | | | | 725/141 |
| 2018/0335922 | A1* | 11/2018 | Nilo | G06F 3/04845 |
| 2018/0349494 | A1* | 12/2018 | Zhao | G06F 16/634 |
| 2019/0155955 | A1* | 5/2019 | Castaneda | G06F 16/335 |
| 2019/0179846 | A1* | 6/2019 | Taboriskiy | G06F 16/48 |
| 2019/0289359 | A1* | 9/2019 | Sekar | H04N 21/4333 |
| 2019/0394419 | A1* | 12/2019 | Zhang | H04N 21/4316 |
| 2020/0356593 | A1* | 11/2020 | Azzinnari | G06F 3/165 |
| 2020/0396497 | A1* | 12/2020 | Liu | H04N 21/4826 |
| 2021/0006867 | A1* | 1/2021 | Liu | H04N 21/4316 |
| 2021/0105538 | A1* | 4/2021 | Ogawa | H04N 21/4316 |
| 2021/0150222 | A1* | 5/2021 | Evans | H04N 21/251 |
| 2021/0160571 | A1* | 5/2021 | Menendez | G06F 18/2413 |
| 2021/0233427 | A1* | 7/2021 | Pesta | G09B 5/065 |
| 2021/0266641 | A1* | 8/2021 | Selfors | H04N 21/4882 |
| 2022/0021950 | A1* | 1/2022 | Wei | H04N 21/44016 |
| 2022/0321972 | A1* | 10/2022 | Chandrashekar | H04N 21/472 |
| 2023/0164296 | A1* | 5/2023 | Chang | G06F 3/0488 |
| | | | | 348/14.09 |
| 2024/0007718 | A1* | 1/2024 | Sheng | G06F 16/7844 |

* cited by examiner

USER INTERFACE METHOD AND APPARATUS FOR VIDEO NAVIGATION USING CAPTIONS

BACKGROUND OF THE INVENTION

One or more embodiments of the present disclosure relate to user interfaces that enable navigation of a video via interaction with text overlaid on the video. In some embodiments, a user interface may receive directional user input with respect to displayed text, and may modify the play position of the video in response.

SUMMARY

Videos can be viewed for a variety of different purposes, including entertainment and informational viewing. In some cases, for example when watching a "How-to" video, the user interface enables captions to be overlaid on the video to provide added information and improve accessibility. Some user interfaces enable navigating through the video by selecting a point on the progress bar to jump to, or by dragging the slider of the progress bar forward or backward to "scrub" through the video. These user interfaces, however, can be difficult to use. The slider and progress bar are small, and do not provide an easy way to jump to a specific desired point of the video, particularly for longer videos. In addition, where captions are turned on, these user interfaces cycle quickly through the captions based on the currently displayed video which can change rapidly based on the input to the user interface. This, in addition to the presentation of a single line of captions at a time, can result in lost context and reduced ease of use. Some user interfaces may display captions in a separate window next to the video. These user interfaces take up valuable limited screen space, particularly for devices with small screens like smartphones and tablets.

Embodiments of the present disclosure address these problems and others by presenting a user interface having additional mechanism(s) for navigating through a video based on displayed text, in addition to navigation by moving a slider on the progress bar. In some examples, the user interface displays multiple lines of captions overlaid on the video simultaneously, thereby providing improved context. The line of captions corresponding to the displayed video segment (i.e., the current line of captions) may be positioned in a middle of the screen, with lines of captions occurring before the current video segment positioned above, and lines of captions occurring after the current video segment positioned below. The user interface provides an intuitive display of the order and context of the captions, and enables easier navigation through the video. For example, the user interface enables directional user interface input for at least a portion of a line of captions, such as tap and drag, click and drag, or swiping, and in response the system modifies the user interface to adjust the play position of the video. In some examples, the directional user interface input is associated with a speed and direction (e.g., a fast upward swipe), and the user interface may responsively navigate through the video in a proportional manner (e.g., fast forward navigation through the video).

In some examples, the user interface may enable selection of a line of captions or a portion of a line of captions, and in response the user interface may automatically change the play position of the video to a video segment corresponding to the selected line. Furthermore, in some examples the user interface may display multiple lines of captions in a page format. The user interface may then enable user interface input such as a left or right swipe to move between pages of captions, while simultaneously updating the play position of the video based on the currently displayed page of captions. This enables quick navigation of videos, and is particularly useful for long videos or videos with a lot of captions.

Another set of issues that may arise relate to when a user interface is utilized to find a particular video segment, and other video segments that match. For instance, a user interface may be utilized to view all the home runs that occurred in the video of a baseball game. In some scenarios a user may be required to manually fast forward through the video to view the video segments that include a homerun. But this manual fast forwarding can take a long time, and can use up a lot of bandwidth to load and play irrelevant parts of the video. Embodiments of the present disclosure address these concerns by presenting a user interface that (1) enables identification of a selected term or phrase in the captioning (e.g., "home run"), such as by detecting a double tap or double click, a press and hold, or another user interface input that indicates selection of the selected term or phrase, (2) automatically searches for and identifies additional uses of that term or phrase in the captioning in other portions of the video, and (3) preloads the video segments that correspond to the first use of the selected term or phrase and the additional uses of the selected term or phrase. The user interface then enables the video to be displayed such that the preloaded video segments the user is interested in are displayed (e.g., all of the home run segments), while skipping over the less relevant segments, which were not preloaded.

A third set of issues relates to when a user interface is utilized for watching a movie, and a viewer is unable to remember a particular character, actor, or song that was used. When the user interface displays the credits of the movie or displays supplemental content associated with the movie (i.e., via an application such as Amazon X-Ray), the user interface may receive user interface input selecting a particular character, actor, or song. The system may then control the user interface to automatically jump to the sections of the movie where the selected character, actor, or song appears or is played. Embodiments of the present disclosure carry out these actions by providing a user interface that (1) enables identification of a selected term or phrase in the displayed credits (e.g., "Character X", or "Song Y"), such as by detecting a double tap or double click, a press and hold, a mouse hover over, or another user interface input that indicates selection of the selected term or phrase, (2) automatically searches for and identifies additional uses of that term or phrase in the movie, and (3) preloads the video segments that correspond to the selected term or phrase. In other embodiments, the user interface may receive user interface input selecting a term or phrase, and in response the system may control the user interface to present a preview image or preview audio segment as a reminder of how and where the term or phrase was used in the movie.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
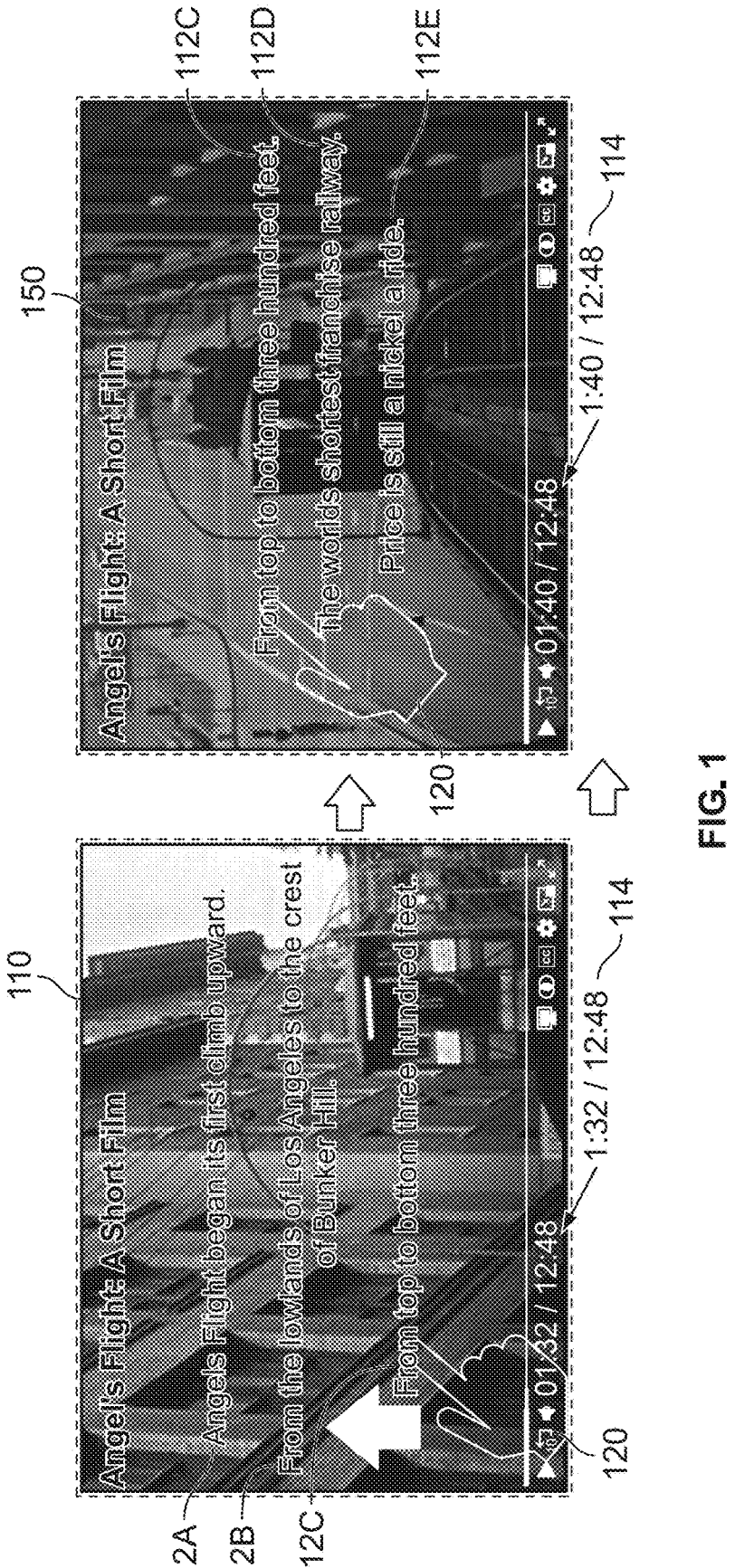
FIG. 1 illustrates an example scenario for navigating a video using directional user interface input received at a user interface, according to aspects of the present disclosure.

As noted above, viewers of streaming videos, particularly informational videos, often find it useful to turn on captioning when using the navigation bar in a video player application so that a desired topical section of the video can be located. But reading the rapidly changing caption line while moving the slider can prove difficult, and it can be difficult to interpret a single line of captions displayed outside of the context of the previous and later phrases or sentences. It may be desirable to have a user interface for presentation of videos that enables scrolling through the captions in a way that is easier to read and provides more contextual information.

Embodiments of the present disclosure address these issues and more by presenting a user interface that (1) enables navigation of a video graphically based on text corresponding to segments of the video, in addition to navigation using a progress bar or play position indicator, and (2) enables navigation of a video using displayed text without requiring a separate window for the text, thereby preserving valuable screen space for the display of the video.

In some embodiments, a user interface enables the selection of a term or phrase used in a video to be searched, and then preloads for display the segments of the video that correspond to the selected term or phrase.

In some other embodiments, a user interface enables the selection of a term, phrase, or song from the credits of a video, and then preloads for display the segments of the video that correspond to the selected term, phrase, or song.

Throughout this disclosure reference may be made to videos and video segments. It should be appreciated that the functions, actions, methods, and systems described herein may also apply to other types of content, such as 3D visualizations, video games, audiobook narration with displayed text, and more. These may be referred to as "content items." And it should be appreciated that this disclosure describes various embodiments in terms of "video" and "video segments" for purposes of explanation only, and the term "content item" and/or "content item segment" may be used instead.

Additionally, various embodiments of this disclosure are described as occurring on a device or system that receives the user interface input as well as displays the video, text, and/or various other features. However, in some embodiments, one or more functions described herein may be performed on a secondary device. That is, a primary device may be used to display the video, while a secondary device is used to navigate via interaction with the lines of text and other user interface elements as descried below. Various features of the disclosure described below may be performed on a distributed system including two or more devices, wherein the first device performs one or more of the functions (e.g., displaying the video) and a second device performs one or more other of the functions (e.g., displaying the lines of text and receiving input). In one example, the first device may display the video while the second device may display the lines of text (but not the video). The user may interact with the lines of text on the second device as described below, and the video displayed on the first device may be modified accordingly (e.g., changing the play position based on the user interaction with the lines of text on the second device).

Additionally, for the sake of explanation, certain functions and actions are described herein as being performed by the user interface. It should be appreciated that the user interface may include or be a part of an application running on a computing device or system. As such, when an action is described as being performed by the user interface, it may also or alternatively be understood as the application and/or system controlling the user interface to carry out the action, such as receiving inputs, modifying the display, presenting various information, and more.

FIG. 1 illustrates an example scenario wherein a user interface enables a user to navigate a video using a directional user interface input received at the user interface. FIG. 1 shows a first display 110 at a first point in time, including three lines of text 112A-C overlaid on the video. In the illustrated embodiment, the lines of text 112A-C are captions corresponding to the segments of the video being displayed. Display 110 also shows a current play position 114 of the video, which is at minute 1:32 of 12:48.

FIG. 1 also illustrates a hand 120 of a user, providing a directional user interface input selecting a portion of the line of text 112C and moving upward in the direction of the displayed arrow. In response to receiving the directional user interface input from the hand 120, the system controls the user interface to move the lines of text 112A-C vertically upward such that the selected line of text 112C is positioned toward the top of the screen, and lines of text 112A-B are removed from the screen.

Additionally, in response to receiving the directional user interface input, the system controls the user interface to generate the next adjacent lines of text 112D-E for display below line of text 112C. The second display 150 of FIG. 1 illustrates the display of lines of text 112C-E. The system also controls the user interface to modify the play position 114 of the video from minute 1:32 to minute 1:40. The play position 114 of the video may correspond to the topmost displayed line of text (e.g., line of text 112A for display 110, and line of text 112C for display 15). Alternatively, the play position 114 of the video may correspond to the middle displayed line of text, the bottom displayed line of text, or some other line of text.

FIG. 1 thus illustrates a scenario in which a user interface receives a directional user interface input comprising a selection of a portion of the displayed text and movement of that displayed text. And in response, the system controls the user interface to update the lines of text overlaid on the video and modify the play position of the video to correspond to the currently displayed line or lines of text.

FIGS. 2-6 illustrate various interactions with the user interface and the resulting changes to the display of the video and lines of text overlaid thereon. As described in further detail below, user interfaces and displays shown and described with respect to FIGS. 2-6 may be part of one or more user devices, such as phones, tablets, computers, wearable devices (e.g., a headset), and/or any device or system having a display and a mechanism for receiving input from a user. As noted above, in some examples, the user interface may include or be part of an application running on a computing device or system configured to control the display and/or detect user input, as described herein.

User interface input and/or directional user interface input may include input received from one or more devices, such as a touch screen, mouse, keyboard, trackpad, game controller, remote control, camera and/or inertial sensors (e.g., for detecting movement and/or gesture inputs), and a microphone for detecting voice inputs, for example.

Example directional user interface input can include a combination of a selection action and a movement action. For example, the directional user interface input can include a tap and swipe on a touch screen, a click and drag using a mouse, a hand gesture (e.g., pointing to a line of text) followed by movement of the hand, and more. In some examples, the selection action may include a single tap, click, or action (pointing finger), or may include a double tap, double click, or some other action. These examples correspond to some embodiments of the present disclosure wherein the user interface comprises a touch screen, mouse and keyboard, and gestural interface (e.g., wearable device). It should be appreciated that other user interfaces may have different mechanisms for receiving input, and these other types of input are also contemplated herein. The tap, click, and gesture inputs are described as examples only and should not be understood as limiting the scope of this disclosure only to those specific types of input.

The movement action or directional action may be any direction, including for example a vertical line up or down, a horizontal line left or right, a diagonal line, a curved line, or more. In some examples, the movement may be in three dimensions (e.g., for a wearable device or when the input is a gesture). It should be appreciated that any input mechanism (e.g., tapping, swiping, clicking, gesturing, etc.), can be used for any or all of the embodiments described herein. For simplicity, only certain example inputs are described in detail and illustrated in the figures.

Figure 2:
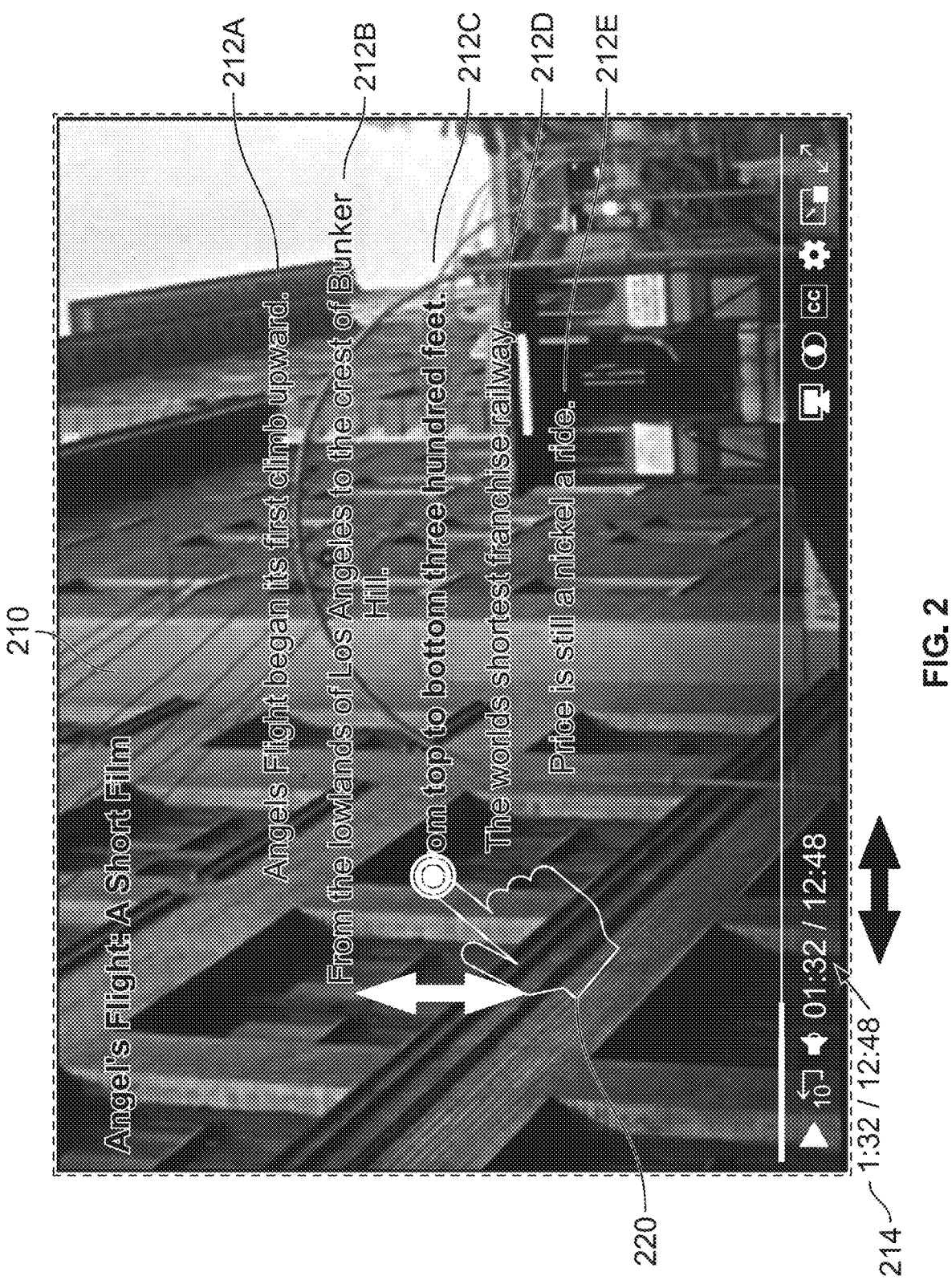
FIG. 2 illustrates an example directional user interface input, according to aspects of the present disclosure.

FIG. 2 illustrates an example directional user interface input to a user interface, wherein an input interacting with the displayed lines of text causes a corresponding change to the play position of the video. Display 210 includes a video overlaid with five lines of text 212A-E. Display 210 also shows the play position 214 shown at minute 1:32/12:48 of the video.

As illustrated in FIG. 2, the user interface detects a directional user interface input from finger of a hand 220 comprising a tap on the touch screen and a vertical movement of the hand after the tap has occurred. It should be appreciated, however, that the directional user interface input may be any suitable input corresponding to the user interface used, such as a tap and swipe, click and drag, gesture, etc.

The user interface detects a selection of a portion of line of text 212C, along with a corresponding upward or downward movement of the selected portion of line of text 212C. While FIG. 2 illustrates a selection of the leftmost displayed word of line of text 212C, the selected portion may alternatively include a different word of the line of text, the selection of an area near the line of text (i.e., to the left, right, above, or below), and/or the selection of a box or other user interface elements corresponding to one or more lines of text. Additionally, the movement after detecting the selection of the line of text, can include any directional movement or indication. For example, the movement shown in FIG. 2 includes a vertical swipe along the touch screen. Other movements or indications can include horizontal movement, diagonal movement, curved movement, selection of a button (e.g., arrow key), indication of a direction (e.g., via joystick of a game controller), and more, depending on the specific type of user interface. In one example, the movement may be perpendicular to a standard movement direction of a progress bar or play position indicator of the video.

In response to receiving and detecting the directional user interface input from the hand 220, the system may control the user interface to cause movement of the lines of text 212A-E overlaid on the video. One or more lines of text are cycled off the screen while one or more other lines of text may be added to the screen. For example, if the directional user interface input moves the lines of test 212A-E upward, line of text 212A may be removed from the display and a next line of text 212F (not shown) may be added to the display.

In some examples, the directional user interface input acting on a portion of a line of text (e.g., one of lines of text 212A-E) may also cause the user interface to modify the play position of the video. For instance, an upward directional user interface input may cause a corresponding forward movement of the play position, and a downward directional user interface input may cause a corresponding backward movement of the play position. In other examples these directions may be reversed, such that an upward directional user interface input may cause a corresponding backward movement of the play position, and a downward directional user interface input may cause a corresponding forward movement of the play position.

In some examples, the modification to the play position may be done at a rate proportional to a speed of the directional user interface input. That is, if a user swipes upward quickly, the play position may change faster than if the user swipes upwards slowly. The speed of the directional user interface input may also cause proportional change in displayed lines of text. That is, a slow upward swipe may cycle through lines of text slowly, while a faster upward swipe may cycle through lines of text quickly. To the user, it may appear that lines of text are positioned on a rolling wheel, and the rate of change in play position and change in displayed lines of text may be proportional to the rate at which the user moves the rolling wheel.

In some examples, the modification to the play position may be smooth or gradual. That is, the modification of the play position may occur at the same time as the directional user input is received. As the user slides his finger upward along the screen, the user interface may gradually change the play position left or right to match the movement of the directional user interface input.

In other examples, the modification of the play position may be abrupt, and/or may not occur until after the directional user interface input has ended. That is, the user may tap and swipe a portion of a line of text using his hand 220, and only after the hand 220 has stopped moving or left contact with the touch screen does the user interface change the play position.

Figure 3:
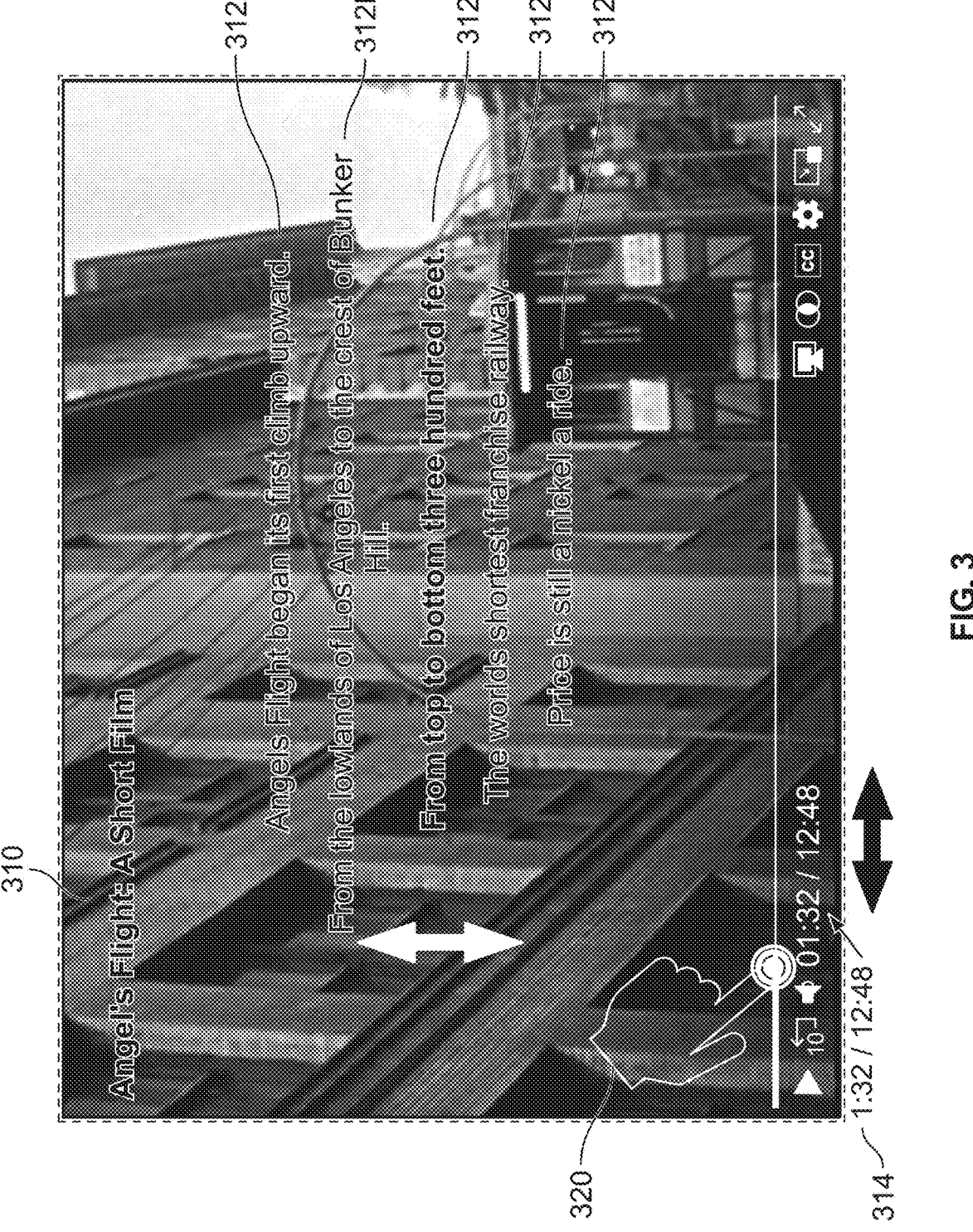
FIG. 3 illustrates another example directional user interface input, according to aspects of the present disclosure.

FIG. 3 illustrates another example directional user interface input to a user interface, wherein an input interacting with the play position of the video causes a corresponding change to the displayed lines of text. Display 310 includes a video overlaid with five lines of text 312A-E. Display 310 also shows the play position 314 shown at minute 1:32/12: 48 of the video.

As illustrated in FIG. 3, the user interface detects a directional user interface input from a hand 220 comprising a tap on the touch screen at the play position indicator, and a horizontal movement of the hand after the tap has occurred. It should be appreciated, however, that the directional user interface input may be any suitable input corresponding to the user interface used, such as a tap and swipe, click and drag, gesture, etc.

The user interface detects the directional user interface input at the play position indicator or slider, and causes a corresponding movement of the play position. Additionally, the user interface moves the lines of text 312A-E. FIG. 3 illustrates a similar scenario to FIG. 2, but having the directional user interface input to the play position 314, resulting in a corresponding modification to the lines of text 312A-E displayed. In some examples, forward (or rightward) movement of the play position indicator or slider may cause the lines of text 312A-E to shift upward (and/or may cause one or more lines to be removed from the display), while another line or lines of text are added to the bottom adjacent to line of text 312E which has shifted upward. Similarly, a directional user interface input moving the slider backward (or leftward) may cause the user interface to shift the lines of text downward, shift line of text 312E off the screen, and add one or more other lines of text above line of text 312A.

Figure 4:
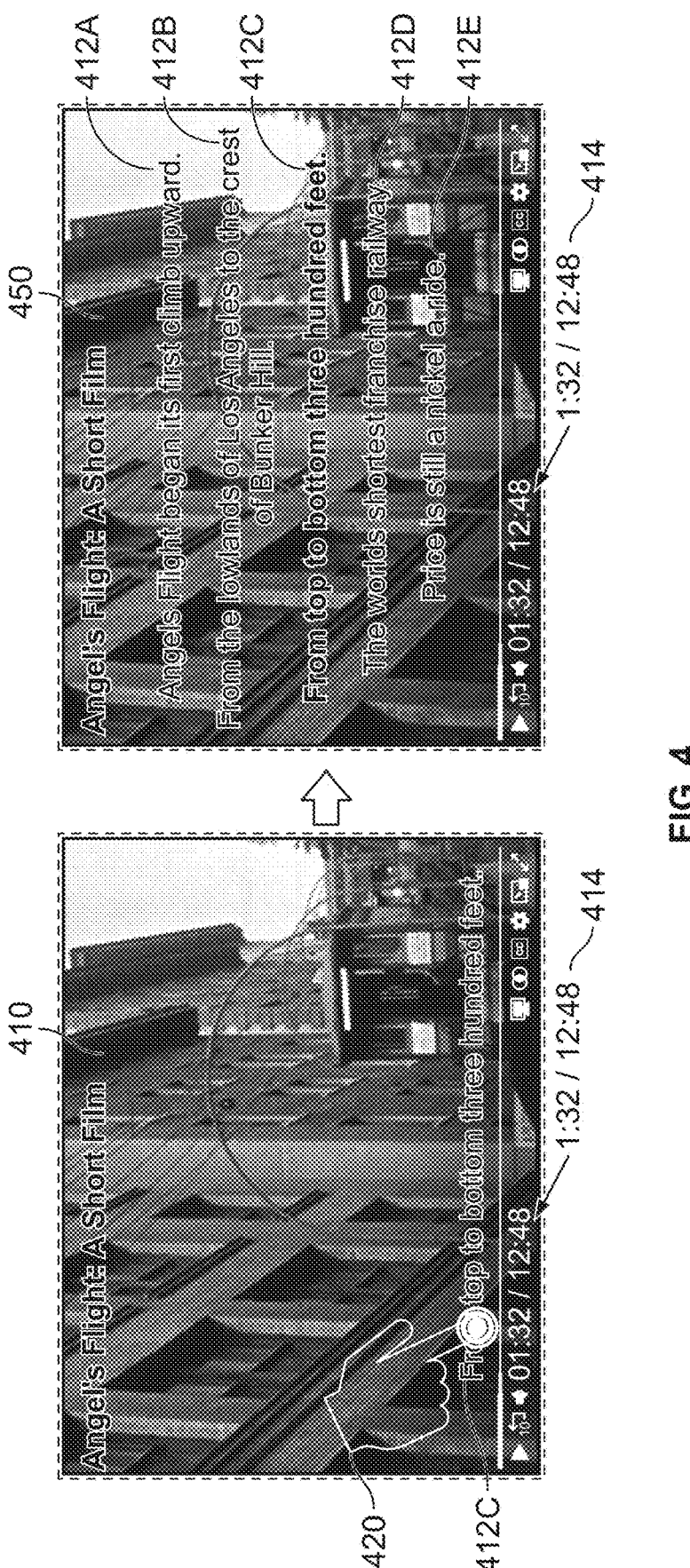
FIG. 4 illustrates an example user interface input selection and corresponding display of lines of text, according to aspects of the present disclosure.

FIG. 4 illustrates an example user interface input selection of a portion of a line of text, and a corresponding display of multiple lines of text. In some examples, the user interface may be configured to display a video with a single line of text (e.g., line of text 412C) corresponding to the currently displayed video segment overlaid on the video. Display 410 of FIG. 4 illustrates this scenario. Then, in response to detecting a selection of the line of text 412C, the system controls the user interface to bring up multiple lines of text 412A-E for display. Display 450 illustrates that in response to a selection of line of text 412C, the user interface displays lines of text 412A-E, including lines of text both before and after the selected line of text. By providing additional lines of text, the user interface provides additional context that can be used to navigate the video. In some examples, the user interface may transition from displaying one line of text to displaying multiple lines of text in response to a selection of the displayed line of text (e.g., as shown in FIG. 4). Alternatively, the user interface may transition in response to a different user input, such as the selection of a page mode, discussed in further detail with respect to FIG. 6, the passage of a certain amount of time since a last input, a user voice input (e.g., "show me more text"), and more.

In some examples, in response to the selection of a line of text, the system may control the user interface to present one or more lines of text that are adjacent to the selected line of text, including lines of text that occur before the selected line of text, lines of text that occur after the selected line of text, and/or a combination of both lines of text that occur before and after the selected line or text. The user interface may display five lines of text (e.g., as shown in FIG. 4), or may display a different number of lines of text. In some examples, in addition to displaying the selected line of text, the user interface may display lines of text that occur after the selected line of text, lines of text that occur before the selected line of text, or a combination of both.

As noted above, the user interface input selecting the selected line of text 412C may be a tap, double tap, click, double click, swipe, multi-finger swipe, gesture, or any other suitable user interface input. Additionally, the user interface input may include a directional component as well, such as a swipe upward, downward, or in some other direction.

In FIG. 4 the current line of text 412C corresponding to the currently displayed video segment is displayed in a middle position on the display. In other examples, the current line of text may be displayed on a top position, a bottom position, or in some other position on the display.

In some examples, the current line of text (e.g., 412C) may be displayed with a visual indication that it is the current line, such as by having the current line of text displayed with a different color than the other line(s). Other visual indicators can include bolding, highlighting, displaying with a different size font, and more. Line of text 412C is shown in FIG. 4 in a bold font, whereas lines 412A-B and 412D-E are displayed in a non-bold font.

Figure 5:
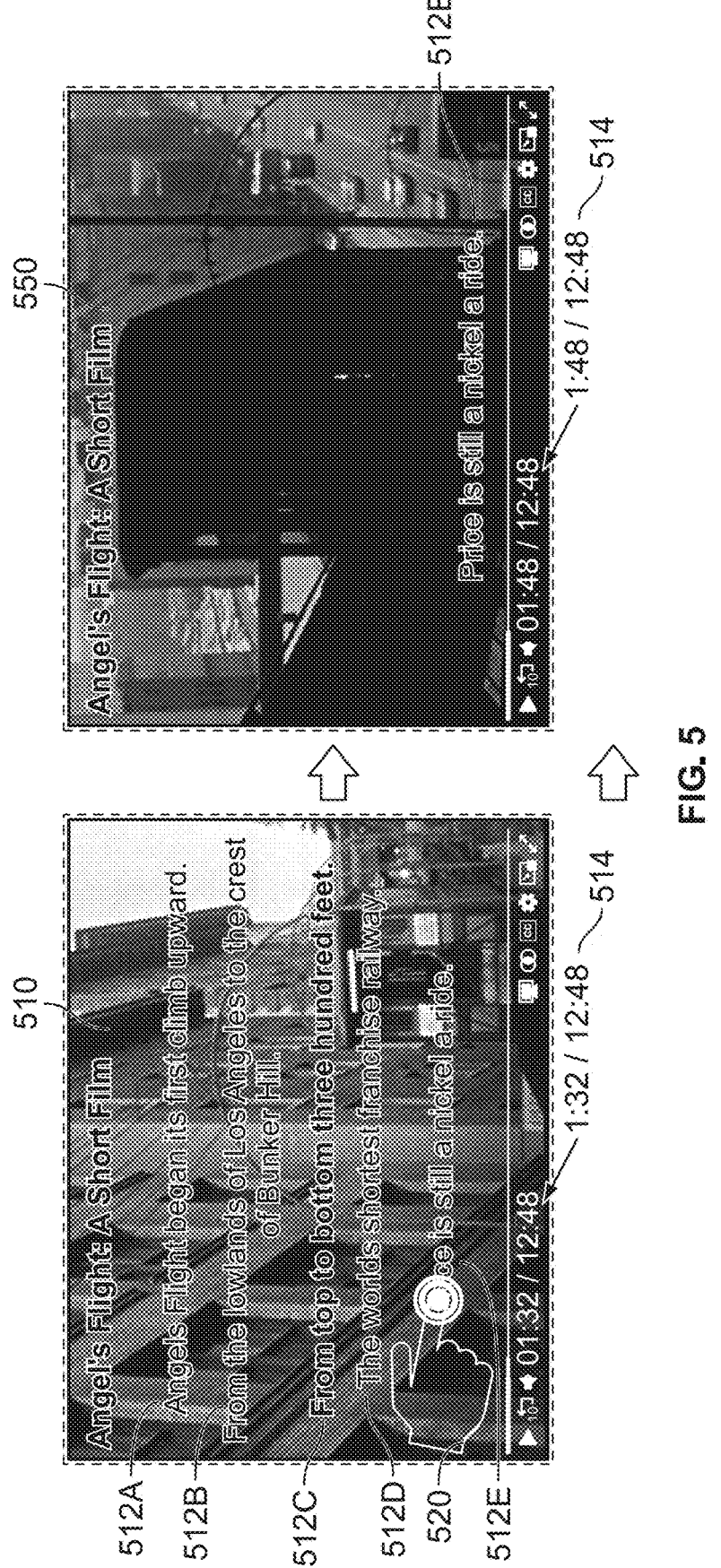
FIG. 5 illustrates an example user interface input selection of a line of text and corresponding movement of the play position of the video, according to aspects of the present disclosure.

FIG. 5 illustrates an example user interface input selection of a line of text 512E and a corresponding movement of the play position of the video, according to an embodiment. Display 510 shows a video overlaid with five lines of text 512A-E. On display 510, the play position 514 is shown at minute 1:32/12:48 of the video. The current video segment being displayed corresponds to the middle line of text 512C.

FIG. 5 illustrates that in some embodiments, the user interface is configured to take one or more actions in response to detecting a selection of a line of text. For example, in response to receiving a selection by the hand 520 of the selected line of text 512E, the system controls the user interface to modify the play position 514 of the video to reflect a video segment corresponding to the selected line of text 512E (e.g., modifying the play position to minute 1:48 corresponding to line of text 512E). Additionally, the user interface may remove the other lines of text 512A-D, and display only the selected line of text 512E as shown in display 550. Further, in some examples the user interface may make change the corresponding line of text 512E to bold, or otherwise visually distinguish it from the other lines of text. In some examples, the user interface may transition from displaying multiple lines of text to displaying a single line of text in response to a selection of the displayed line of text (e.g., as shown in FIG. 5). Alternatively, the user interface may transition in response to a different user input, such as the selection of a regular mode, discussed in further detail with respect to FIG. 6, the passage of a certain amount of time since a last input, a user voice input (e.g., "show me less text"), and more.

In some examples, as noted above, the selection of the line of text 512E can include tapping, double tapping, clicking, double clicking, swiping, drawing a shape, gesturing, and/or some other user interface input. Each input can include a directional aspect as well, such as a vertical, horizontal, diagonal, or other direction of movement. Each input may be tied to or correspond to a particular line of text or portion of a line of text, or may simply be an input with respect to the display (i.e., not tied to a particular line of text or portion of a line of text). In some examples the input may correspond to the play position indicator or slider.

In some examples, one or more user interface inputs may cause the user interface to (a) transition from no text displayed to displaying text (i.e., turning on text or captions), (b) transition from a single line of text corresponding to the current video segment to multiple lines of text (e.g., FIG. 4), (c) transition from a first page of lines of text to a second page of lines of text (e.g., as discussed in further detail below with respect to FIG. 6), or take some other action.

Figure 6:
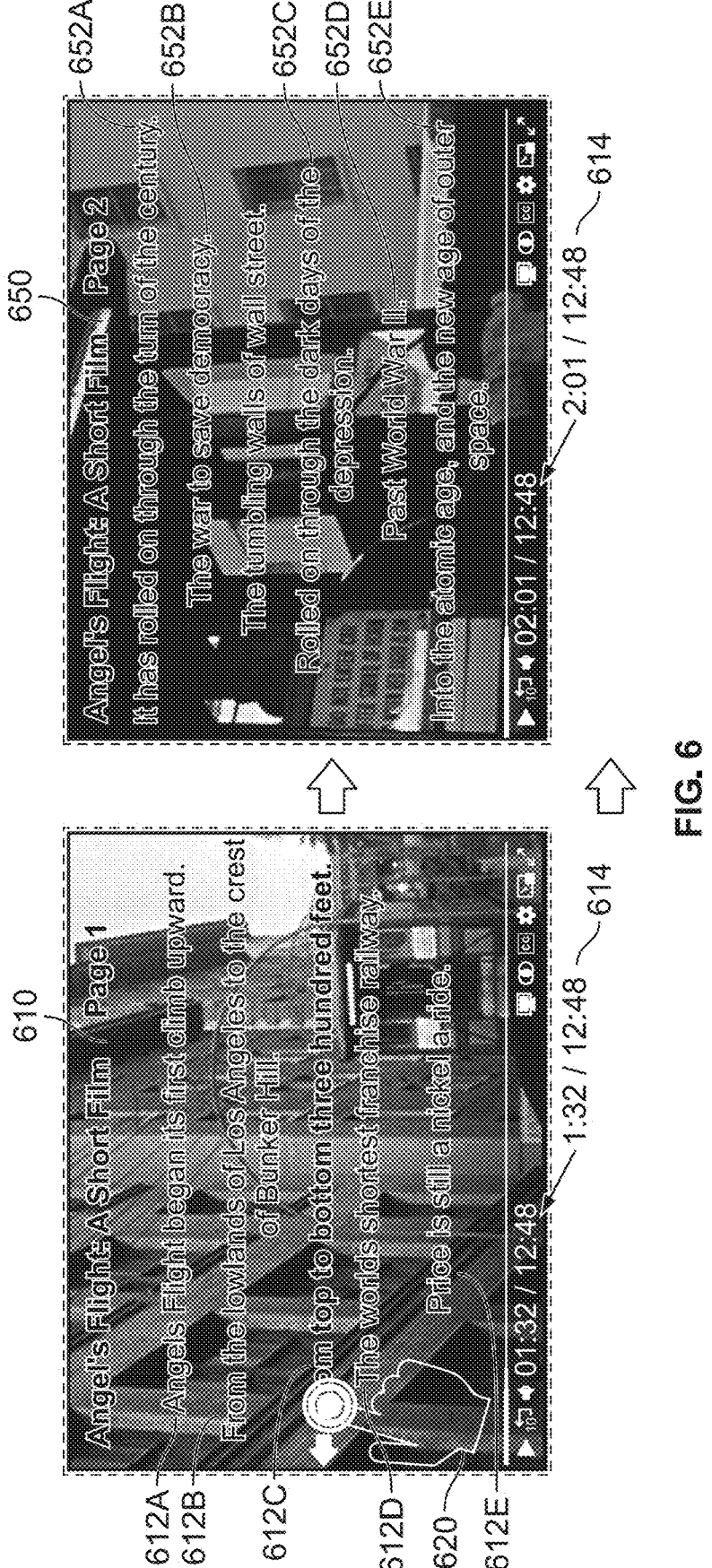
FIG. 6 illustrates an example directional user interface input with respect to a first page of lines of text and corresponding display of a second page of lines of text, according to aspects of the present disclosure.

FIG. 6 illustrates an example user interface operating in a "page mode," wherein a directional user interface input with respect to a first page of lines of text results in a display of a second page of lines of text.

FIG. 6 shows a display 610, including a video overlaid with five lines of text 612A-E. On display 610, the play position 614 is shown at minute 1:32/12:48 of the video, corresponding to the current line of text 612C.

Lines of text 612A-E are displayed in a page format, which can be acted upon to navigate through the video more quickly. Each page of lines of text may include multiple lines of text, and the user can navigate the pages of text with horizontal swiping, for example. In some embodiments, swiping to the left will turn to the next page, while swiping to the right will turn to the previous page. In some examples, the user interface may also display a page number, such as page 13 of 127. This may provide additional context to the user to aid the user in more easily navigating through the video.

When the user interface detects a directional user interface input (e.g., a tap and swipe from hand 620 selecting a portion of a line of text of one of lines 612A-E), the user interface may transition from what is shown in display 610 to what is shown in display 650. In response to detecting the directional user interface input, the system controls the user interface to display a second page of lines of text including lines of text 652A-E. Additionally, the system controls the user interface to modify the play position 614 to reflect a play position corresponding to a first line of text of the second page, shown as minute 2:01/12:48 of the video corresponding to line of text 652C. It should be understood that the play position, and therefore current video segment, may correspond to the middle line of text (e.g., 652C), or may correspond to one of the other lines of text, such as the top line of text 652A. As the user navigates through the pages of lines of text, the play position may be updated accordingly, as well as the currently displayed video segment. Similarly, if the user selects and moves the slider or play position indicator 614, the displayed page of lines of text may also change accordingly.

In some examples, a directional user interface input corresponding to a portion of a line of text of the displayed page may cause the user interface to bring up a next page, and to modify the play position to reflect the next page. Additionally, in some examples, a user interface input selecting a selected line of text causes the user interface to navigate the video to the time stamp of the beginning of this line of text and begin to play the video (e.g., similar to FIG. 5).

In some examples, each page of lines of text may comprise a set of metadata, including a starting and ending time stamp for the page, a starting timestamp of each line of text of the page, and an associated set of images that are extracted from the video corresponding to the page and/or the lines of text of the page. When a page is shown, the image(s) may be displayed in the background, and the time stamps of the image(s) may be indicated on the navigation bar.

In some examples, the user interface may operate in one or more modes of operation. For example, there may be a "regular mode" of operation (e.g., FIGS. 1-5) wherein lines of text are displayed in a continuous manner in response to directional user input scrolling through the text, and are not navigable as pages. The user interface may also operate in a "page mode" (e.g., FIG. 6), wherein the lines of text are navigable as pages of text, like in a book. The user interface may switch between these modes of operation based on detection of a user interface input. For instance, the system may control the user interface to switch from the regular mode to the page mode in response to detecting a click-and-hold or click-and-swipe-up. The system may control the user interface to transition from the page mode to the regular mode in response to detecting a click or tap on a line of text to play from the starting time stamp of that line of text, click "Esc" on a keyboard, click the "back" button on a remote control, or swipe down, for example.

In some examples, the system may control the user interface to reduce a text size to put more lines of text on a page for quicker navigation, in response to a user interface input. Additionally, in some examples, two or more pages can be grouped into chapters for quicker navigation. The user interface may display a chapter comprising the first line of each page (i.e., a page has five lines, and five pages are grouped to a chapter, such that displaying the chapter includes displaying the first line of each of the respective pages). A user may navigate chapters like the navigation of pages discussed herein.

Figure 7:
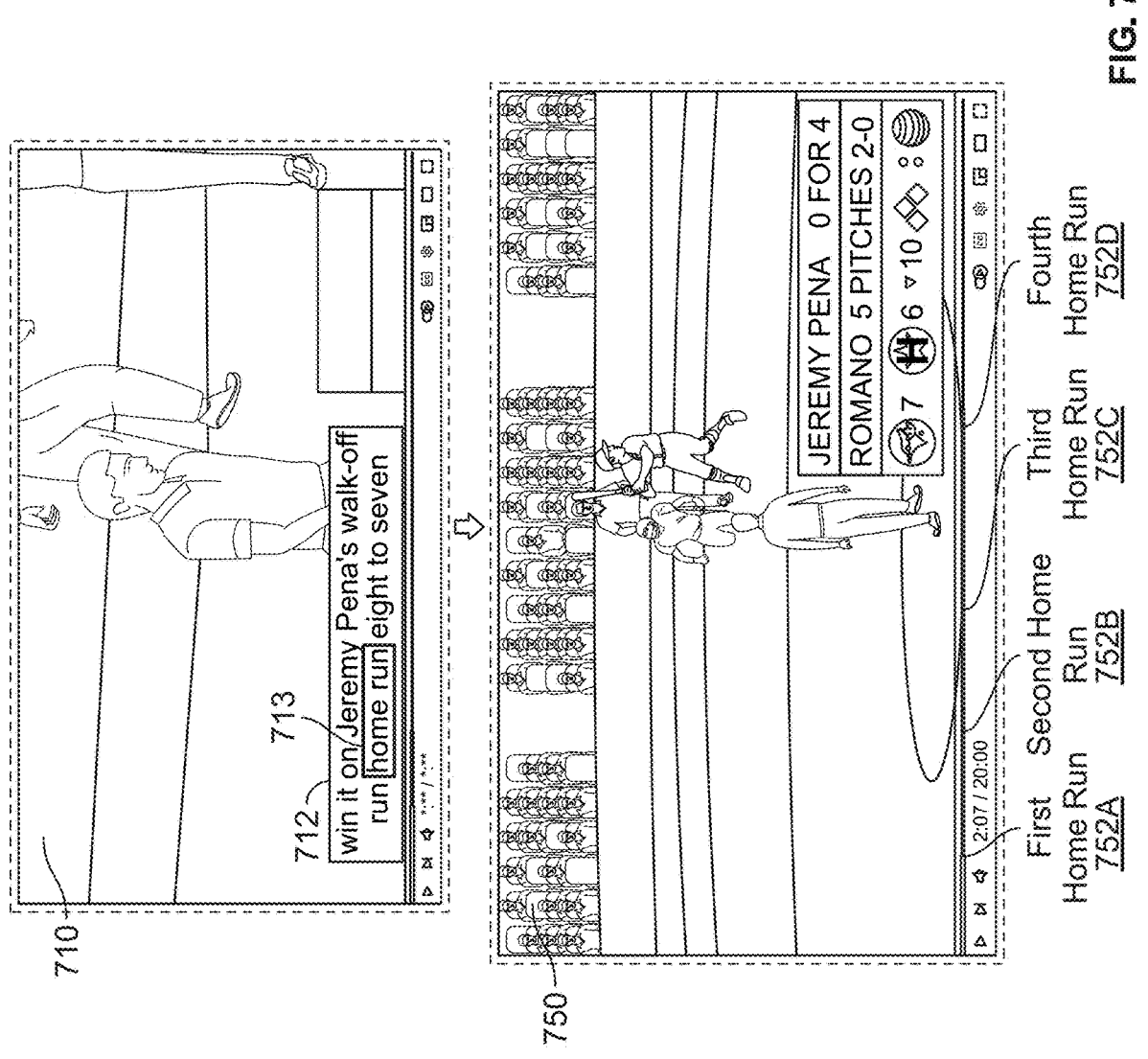
FIG. 7 illustrates an example user interface input selecting a portion of displayed text, according to aspects of the present disclosure.

FIG. 7 illustrates an example user interface input selecting a portion of displayed text, and the resulting preloading and display of video segments corresponding to the selected text. In certain embodiments, the user interface enables a user to select a portion of displayed text, and searches the video for other video segments that correspond. These other segments are then indicated to the user visually (such as along the progress bar), preloaded, and played for the user.

As shown in FIG. 7, the user interface shows display 710 including a video with a line of text 712 overlaid thereon. The user interface can then detect the selection of a selected term, phrase, or keyword 713 (e.g., "home run"). The text 713 can be selected using any suitable mechanism, such as a double-tap and hold on the first word and then drag to the last word. Other inputs may include, clicking, double clicking, tapping, double tapping, highlighting the selected text with a mouse click and drag, making a gesture, or using any other input, such as those described above.

In response to receiving the user interface input selecting the selected text 713, the system may control the user interface to perform a search of the video for additional video segments that include or correspond to the selected text 713. The user interface may search the text corresponding to the video for other uses of the same term, for example. In the example illustrated in FIG. 7, the user interface receives the selected term "home run," and searches the text of the video for additional video segments wherein the term "home run" is used. These corresponding video segments are shown as segments 752A-D on display 750. In some examples, certain video segments may be indexed according to the specific type of video. For example, a baseball video may be indexed and have metadata associated with various video segments for each action taken in the video, such as strikeouts, hits, home runs, steals, etc. Then, even if a particular video segment does not include the specific text being searched, the user interface may still be able to determine the video segments relevant to the text selected by the user. For instance, if the user selects the term "home run," but the announcers only say "grand slam" for one video segment and fail to say "home run" (i.e., so the captions associated with the "grand slam" segment do not include the selected term explicitly), the user interface may still be able to determine that the "grand slam" segment should also be preloaded in addition to any other video segments where the term "home run" was used.

After the user interface determines the video segments corresponding to the selected text, the user interface may preload or buffer those video segments. The buffering may be applied to those corresponding video segments only, and other segments (such as those between the corresponding video segments) may be ignored. The user interface can then begin playback of the corresponding video segments, skipping from one buffered video segment to the next and not playing all segments of the video continuously.

In addition to receiving the selected text 713, performing the search of the video, and preloading the corresponding video segments, the user interface may also provide a visual indication of the corresponding video segments. As shown in FIG. 7, the user interface displays a shaded portion of the progress bar corresponding to the preloaded video segments for the first, second, third, and fourth homeruns of the video. Other examples may include displaying an icon at each point on the progress bar having a corresponding video segment, a list of the time stamps for the corresponding video segments, or some other visual indication of the video segments corresponding to the selected text.

Figure 8:
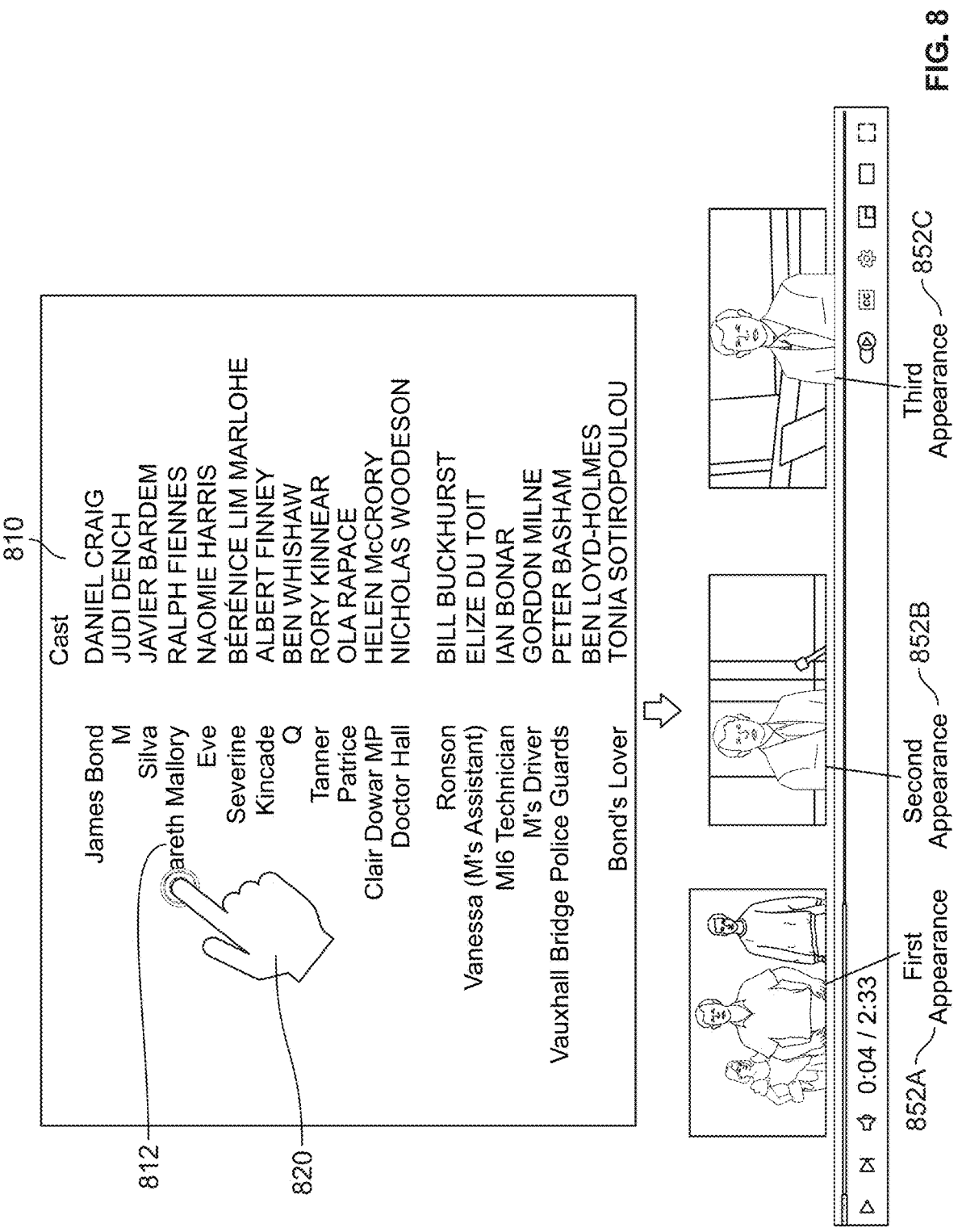
FIG. 8 illustrates an example user interface input selecting a portion of displayed credits of the video, according to aspects of the present disclosure.
Figure 9:
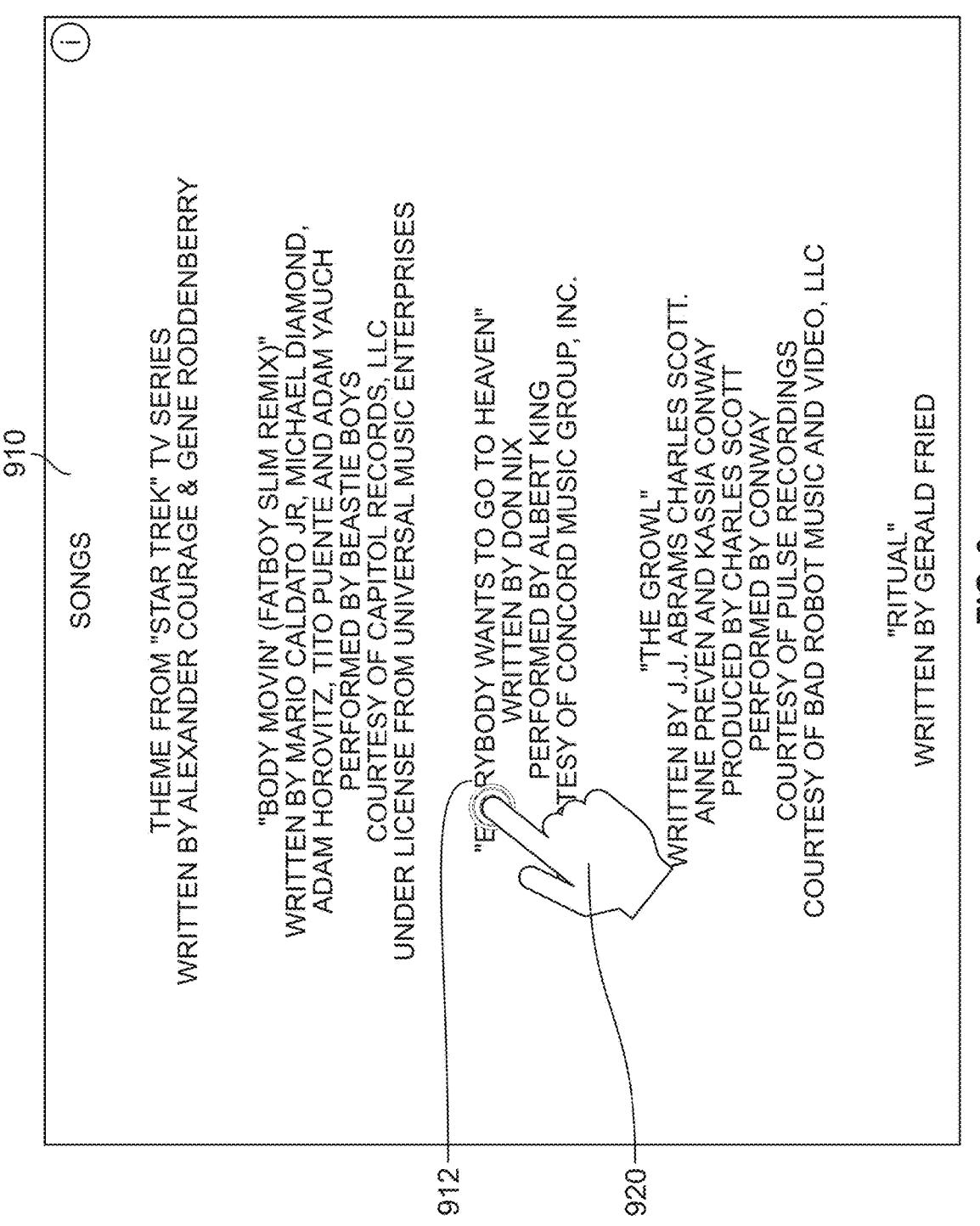
FIG. 9 illustrates another example user interface input selecting a portion of displayed credits of the video, according to aspects of the present disclosure.

FIGS. 8 and 9 illustrate embodiments wherein the user interface displays credits of a video (and/or text that is displayed as part of the video and not overlaid onto the video), and enables a user to interact with the credits to navigate through the video and/or obtain additional information. In some examples, a video may include credits in the form of text and images. The video may include an image map for each frame of the credits section of the video, linking regions of the screen on that frame to corresponding text and appropriate timestamp information for navigation. In some examples, a video may be analyzed to determine the image map, using various technologies such as optical character recognition (OCR) and others. This framework enables the credits to act as hyperlinks to access segments of the video corresponding to content of credits (e.g., actors' scenes, song usage in scenes, etc.).

It should be appreciated that "credits" may also refer to captions or other text displayed as a part of the video. Similar to the disclosed embodiments above, a user can select positions in the "credits" (e.g., via a touch, point or other gesture) and can immediately navigate to the sections of the video where the selected credit item appears.

FIG. 8 illustrates an example display 810 of a user interface receiving a user interface input from a hand 820 selecting a portion of displayed credits 812 of a video. As shown, the hand 820 is selecting the character name "Gareth Mallory" from the credits, corresponding to the actor Ralph Fiennes. In response, the system may control the user interface to search for video segments that include the character Gareth Mallory, shown as segments 852A-C. The user interface may also preload these video segments, and begin playing the video segments, similar to the embodiment discussed with respect to FIG. 7. The user interface may also provide a selectable element for the user to interact with to begin playing the video segments including Gareth Mallory, and/or to navigate between these segments.

Similar to the discussion above, the user interface may enable selection of the text, word, phrase, etc. of the credits using any suitable method, such as tapping, double tapping, clicking, double clicking, etc. The user interface may perform a search of the video for corresponding segments based on metadata associated with the video, which may indicate which actors are present in any given frame.

As with the embodiment described with respect to FIG. 7, the user interface may present a visual indication of the corresponding video segments. As shown in FIG. 8, the user interface may display an icon indicating the points along the progress bar that include the corresponding video segments. Alternatives may include shading the portions of the progress bar corresponding to the preloaded video segments, presenting a list of the time stamps for the corresponding video segments, or some other visual indication of the video segments corresponding to the selected portion of the credits.

In some examples, in response to receiving a selection of a portion of the credits, the system may control the user interface to automatically set a current play position of the video to a first video segment of the one or more video segments that correspond to the selected portion of the credits. That is, the user interface may automatically jump to the first video segment that corresponds to the selected portion of the credits. In other examples, the user interface may present a preview window, showing a still image or thumbnail of the video segment that corresponds to the selected portion of the credits, without changing the current play position of the video.

FIG. 9 illustrates another example display 910 of a user interface receiving a user interface input from a hand 920 selecting a portion of displayed credits 912 of a video. As shown, the hand 920 is selecting the song title "Everybody wants to go to heaven" from the credits. In response, the system may control the user interface to search for video segments that include the selected song. The user interface may also preload these video segments, and begin playing the video segments, similar to the embodiment discussed with respect to FIG. 7. The user interface may also provide a selectable element for the user to interact with to begin playing the video segments including the selected song, and/or to navigate between these segments.

In some examples, the user interface may provide a preview of the selected song (e.g., a 10 second snippet) to allow the user to recognize the song, without changing the play position to jump to the video segment that includes the song. In other examples, the user interface may generate for display a still frame image of the scene in which the song was played, to remind the user of the song's usage with greater context.

As with the examples disclosed with respect to FIGS. 7 and 8, the user interface may enable selection of the song, text, word, phrase, etc. of the credits using any suitable method, such as tapping, double tapping, clicking, double clicking, etc.

Figure 10:
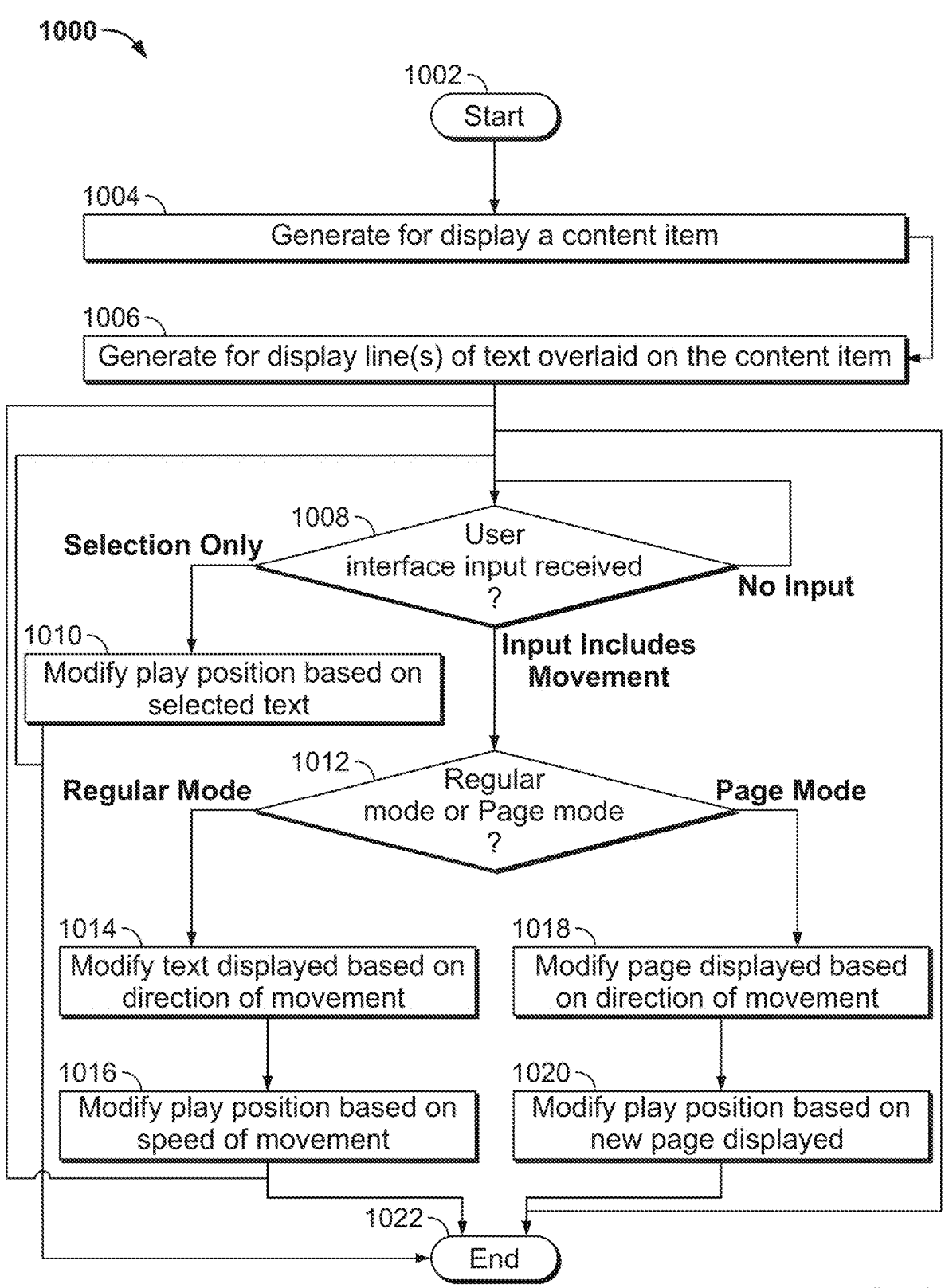
FIG. 10 illustrates a flowchart of an example method for navigating a video via interaction with displayed text, according to aspects of the present disclosure.

FIG. 10 is a flowchart of an illustrative process for navigating a content item (e.g., a video) via interaction with text overlaid on the video, in accordance with some embodiments of the disclosure. As shown in FIG. 10, in accordance with some embodiments, a process 1000 may be executed by processing circuitry 1340 of a client device (FIG. 13). It should be noted that process 1000 or any step thereof could be performed on, or provided by, the system of FIG. 13 or any of the devices shown in FIGS. 1-9. Some steps of process 1000 may be described as being performed by the user interface. However, it should be appreciated that the user interface may be incorporated into a computing device such as client device 1318, and the functions described may be performed by a user interface of the client device 1318, the display 1334, the control circuitry 1328, and/or some other component of the device 1318. In addition, one or more steps of process 1000 may be incorporated into or combined with one or more other steps described herein. For example, process 1000 may be executed by control circuitry 1328 of FIG. 13 as instructed by an interface application implemented running on the client device 1318 in order to enable a user to navigate a video via the displayed text. Also, one or more steps of process 1000 may be incorporated into or combined with one or more steps of any other process or embodiment, such as processes 1100 and 1200 described with respect to FIGS. 11 and 12.

At step 1002, process 1000 begins. At step 1004, control circuitry in connection with a user interface and/or input/output circuitry is configured to generate for display, a content item. The content item may be a video, including a plurality of video segments. Step 1004 may include receiving video segments from another device (e.g., a server such as server 1302), and/or displaying the video segments via a display.

At step 1006, the control circuitry in connection with the user interface and/or input/output circuitry is configured to generate for display, one or more lines of text overlaid on the content item (e.g., video). The lines of text may correspond to the video segments.

At step 1008, the process 1000 includes the input/output circuitry determining whether a user interface input has been received. If no user interface input has been received, the process 1000 continues to wait for an input to be detected, and continues to generate the content item and one or more lines of text for display.

If a user interface input has been received, and the input includes only a selection of a portion of the one or more lines of text (e.g., there is no directional component to the user interface input), the process 1000 includes step 1010 wherein the control circuitry modifies the play position of the content item (e.g., video) based on the selected text. When the user interface input detected at step 1008 includes only a selection of a portion of the one or more lines of text overlaid on the content item, the control circuitry jumps the play position to the content item segment corresponding to that selected line of text, as discussed in further detail above with respect to FIG. 5.

If the user interface input includes a movement component at step 1008, the process 1000 proceeds to step 1012. At step 1012, the control circuitry determines whether the user interface is operating in a "regular mode" (as shown in FIGS. 1-5), or in a "page mode" (e.g., as shown in FIG. 6).

If operating in the "regular mode," step 1014 includes the control circuitry modifying the test displayed based on the direction of movement. For example, if the user interface input includes an upward swipe (e.g., FIG. 1), the displayed text is moved upward. Similarly, if the user interface input includes a downward swipe, the displayed text may be moved downward.

At step 1016, the control circuitry modifies the play position of the content item (e.g., video) based on the speed of movement of the user interface input. That is, if the user interface input is a fast upward swipe, the control circuitry may make a larger jump forward than if the user interface input is a slow upward swipe. As noted above, the modification to the play position may be proportional to the rate of movement of the user interface input.

If, however, at step 1012 the control circuitry determines that it is operating in the "page mode" wherein pages of lines of text are displayed, the process 1000 proceeds to step 1018. At step 1018, the process 1000 includes the control circuitry modifying the page of lines of text displayed based on the direction of movement. For example, if the user interface input includes a left swipe, the control circuitry may transition to a next page of lines of text. And if the user interface input includes a right swipe, the control circuitry may transition to a previous page of lines of text.

Additionally, at step 1020, the control circuitry may modify the play position of the content item (e.g., video) based on the new page displayed. That is, when a left swipe brings up a next page of lines of text, the play position may be modified to jump forward to a segment corresponding to one of the lines of text of the next page of lines of text. Similarly, if a right swipe brings up a previous page of lines of text, the play position may be modified to jump backward to a segment corresponding to one of the lines of text of the previous page of lines of text.

After steps 1010, 1016 and/or 1020, the process may proceed back to step 1008 to await a further user interface input. If another user interface input is received, steps 1008-1020 may be repeated. Alternatively, the process may proceed to step 1022 and end. This may occur if the user selects an exit option, if a timer runs out, or if some other action is taken to end the process 1000.

Figure 11:
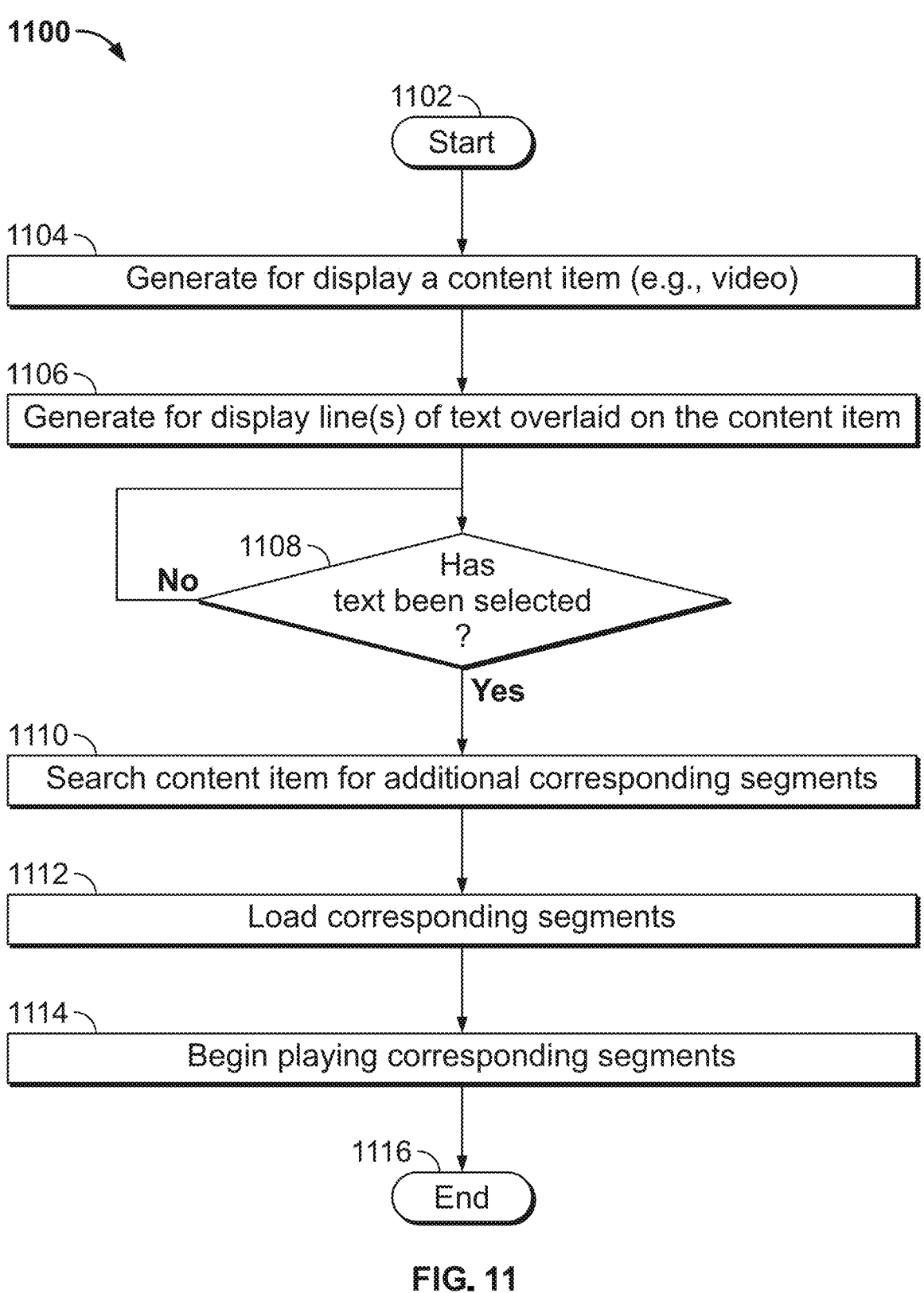
FIG. 11 illustrates a flowchart of a second example method for navigating a video via interaction with displayed text, according to aspects of the present disclosure.

FIG. 11 is a flowchart of an illustrative process for searching text overlaid on a content item (e.g., video), and in response preloading and playing corresponding content item segments (e.g., video segments), in accordance with some embodiments of the disclosure. As shown in FIG. 11, in accordance with some embodiments, a process 1100 may be executed by processing circuitry 1340 of a client device (FIG. 13). It should be noted that process 1100 or any step thereof could be performed on, or provided by, the system of FIG. 13 or any of the devices shown in FIGS. 1-9. Some steps of process 1100 may be described as being performed by the user interface. However, it should be appreciated that the user interface may be incorporated into a computing device such as client device 1318, and the functions described may be performed by a user interface of the client device 1318, the display 1334, the control circuitry 1328, and/or some other component of the device 1318. In addition, one or more steps of process 1100 may be incorporated into or combined with one or more other steps described herein. For example, process 1100 may be executed by control circuitry 1328 of FIG. 13 as instructed by an interface application implemented running on the client device 1318 in order to enable a user to select displayed text and play corresponding video segments. Also, one or more steps of process 1100 may be incorporated into or combined with one or more steps of any other process or embodiment, such as processes 1000 and 1200 described with respect to FIGS. 10 and 12.

At step 1102, process 1100 begins. At step 1104, control circuitry in connection with a user interface and/or input/output circuitry is configured to generate for display, a content item, such as a video. This may include receiving content item segments from another device (e.g., a server such as server 1302), and/or displaying the segments via a display.

At step 1106, the control circuitry in connection with the user interface and/or input/output circuitry is configured to generate for display, one or more lines of text overlaid on the content item (e.g., video). The lines of text may correspond to the content item segments.

At step 1108, the process 1100 includes the input/output circuitry determining whether a user interface input selecting a portion of the displayed text has been received. If no user interface input has been received, the process 1100 continues to wait for an input selecting a portion of the displayed text to be detected, and continues to generate the content item and one or more lines of text for display.

When the control circuitry and/or input/output circuitry determines that a portion of the displayed text has been selected (e.g., via a tap, click, double tap, etc.), the process 1100 proceeds to step 1110. At step 1110, the control circuitry searches for additional content item segments corresponding to the received selected text. For example, as shown in FIG. 7, the selected text is the phrase "home run," and the search includes searching for video segments that correspond to other uses of the term "home run" in the displayed text. Additionally, the search may look at metadata or other information associated with the video segments and/or displayed text to determine which, if any, video segments correspond to the selected term.

At step 1112, the control circuitry loads or buffers the corresponding video segments. And at step 1114, the control circuitry and/or input/output circuitry begins playing the corresponding video segments. The process 1100 may then end at step 1116, for example when a user input selecting an exit or end option is received, or when some other input is received.

Figure 12:
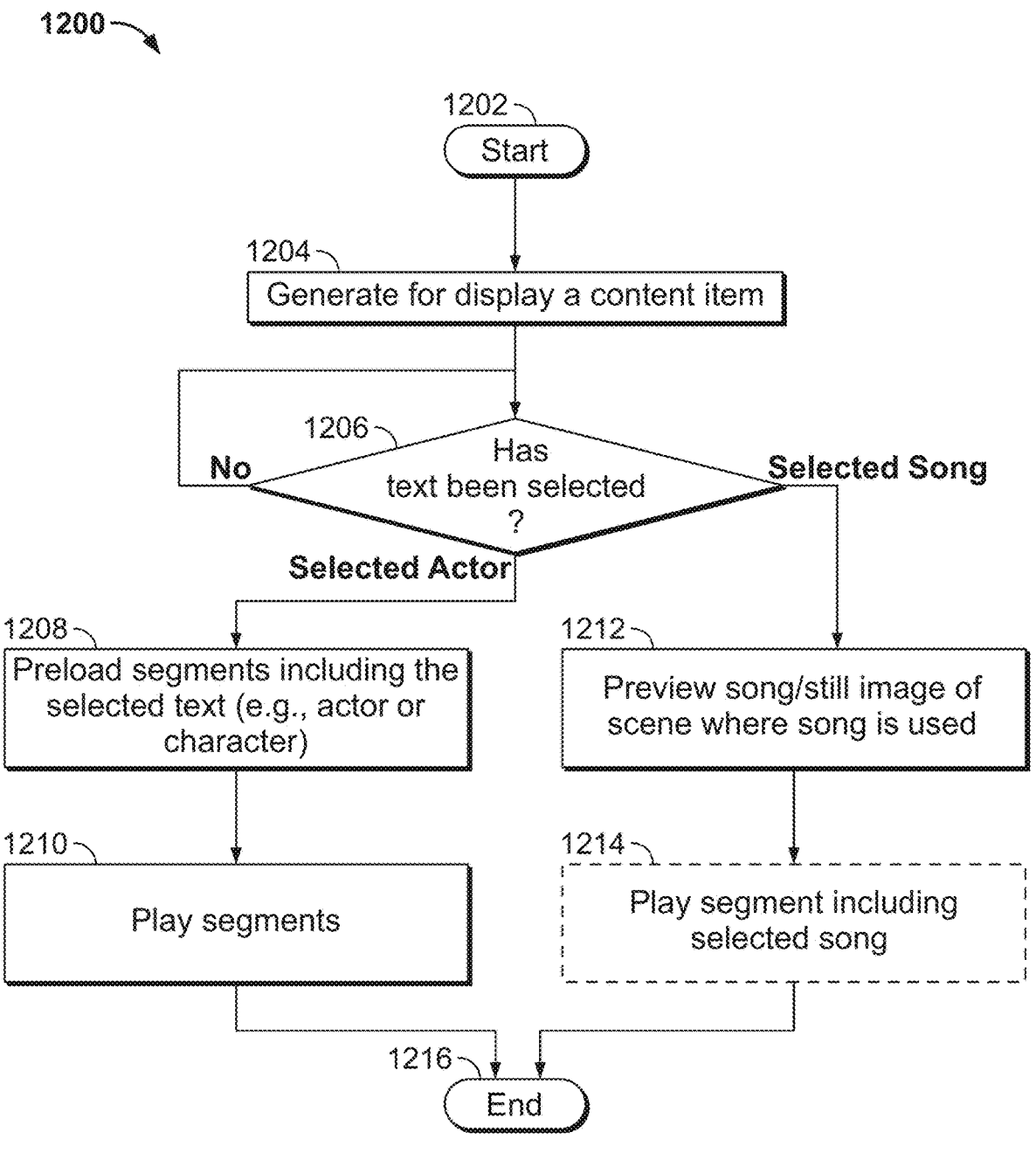
FIG. 12 illustrates a flowchart of a third example method for navigating a video via interaction with displayed text, according to aspects of the present disclosure.
Figure 13:
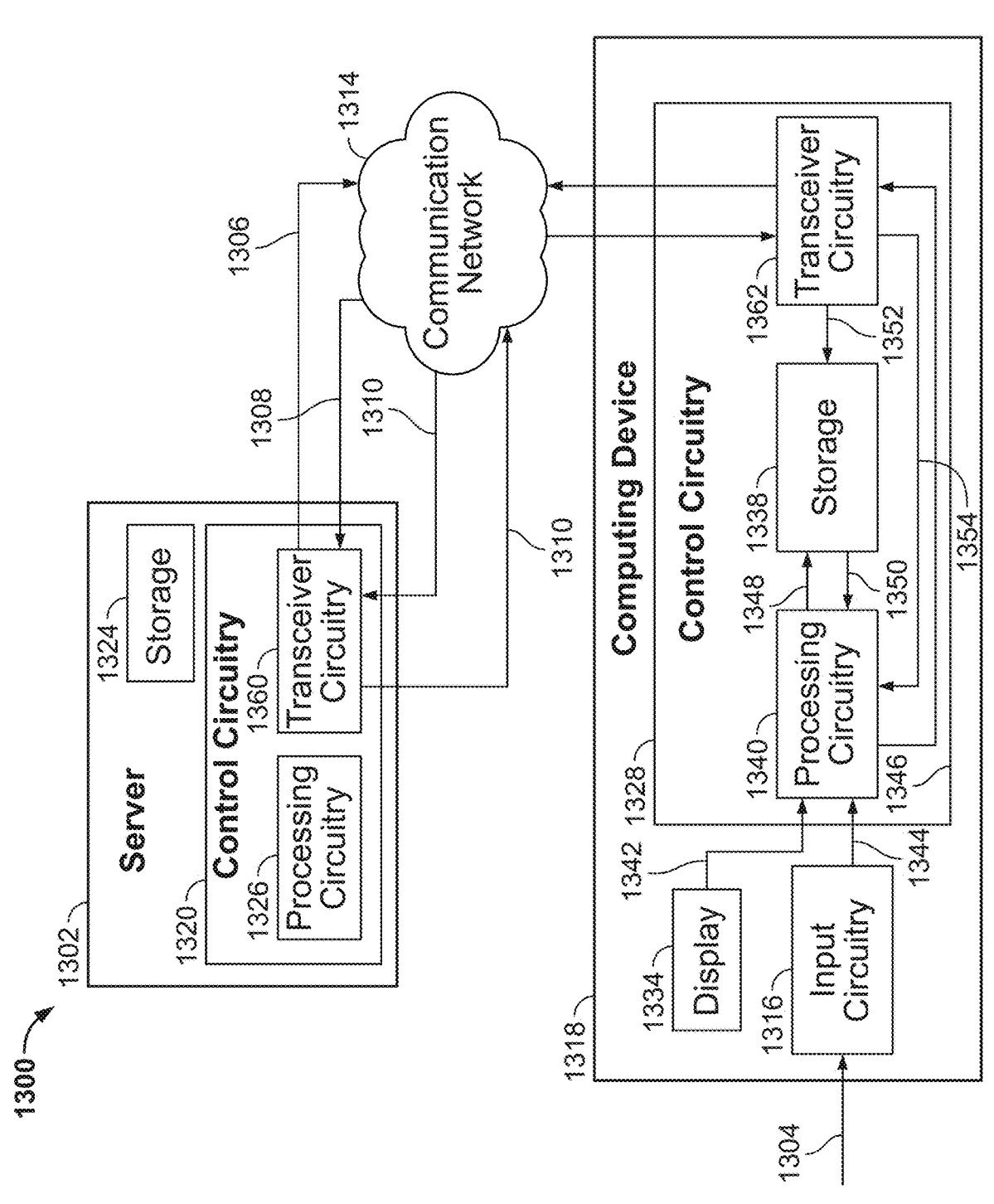
FIG. 13 illustrates a simplified block diagram representing devices, components of each device, and data flow therebetween for navigating a video via interaction with displayed text, in accordance with some embodiments of the disclosure.

FIG. 12 is a flowchart of an illustrative process for detecting a selection of a portion of credits of a content item (e.g., video), and in response preloading and playing corresponding segments or previewing a segment corresponding to the selected portion of the credits, in accordance with some embodiments of the disclosure. As shown in FIG. 12, in accordance with some embodiments, a process 1200 may be executed by processing circuitry 1340 of a client device (FIG. 13). It should be noted that process 1200 or any step thereof could be performed on, or provided by, the system of FIG. 13 or any of the devices shown in FIGS. 1-9. Some steps of process 1200 may be described as being performed by the user interface. However, it should be appreciated that the user interface may be incorporated into a computing device such as client device 1318, and the functions described may be performed by a user interface of the client device 1318, the display 1334, the control circuitry 1328, and/or some other component of the device 1318. In addition, one or more steps of process 1200 may be incorporated into or combined with one or more other steps described herein. For example, process 1200 may be executed by control circuitry 1328 of FIG. 13 as instructed by an interface application implemented running on the client device 1318 in order to enable a user to select a portion of the credits and optionally play corresponding video segments. Also, one or more steps of process 1200 may be incorporated into or combined with one or more steps of any other process or embodiment, such as processes 1000 and 1100 described with respect to FIGS. 10 and 11.

At step 1202, process 1200 begins. At step 1204, control circuitry in connection with a user interface and/or input/output circuitry is configured to generate for display, a content item (e.g., video), which may include credits. This may include receiving content item segments from another device (e.g., a server such as server 1302), and/or displaying the segments via a display.

At step 1206, the process 1200 includes the input/output circuitry determining whether a user interface input selecting a portion of the displayed credits text has been received. If no user interface input has been received, the process 1200 continues to wait for an input selecting a portion of the displayed credits text to be detected, and continues to generate the content item for display.

If the portion of the selected credits is an actor name or character name, the process 1200 proceeds to step 1208. At step 1208, the control circuitry searches for segments corresponding to the received selected actor name or character name (e.g., all content item segments that include that actor or character). The control circuitry also loads or buffers those content item segments including the actor or character. And at step 1210, the control circuitry and/or input/output circuitry begins playing the content item segments including the actor or character.

If, however, the selected text at step 1206 includes a song title, or corresponds to a song displayed as part of the credits, the process 1200 proceeds to step 121. At step 1212, the control circuitry and/or input/output circuitry presents a preview of the selected song, and/or a preview image or short video segment of the scene in which the song was played. This preview image or video may be shown in a smaller preview window.

In some cases, the process 1200 then includes step 1214 in which the content item segment or scene including the selected song is played. This can include the control circuitry modifying the play position of the content item to jump to the content item segment that includes the selected song.

The process 1200 may then end at step 1216, for example when a user input selecting an exit or end option is received, or when some other input is received.

FIG. 13 is a block diagram representing devices, components of each device, and data flow therebetween for a system for providing a user interface to enable a user to navigate a video using displayed text, in accordance with some embodiments of the disclosure. System 1300 is shown to include a client device 1318, a server 1302 and a communication network 1314. It is understood that while a single instance of a component may be shown and described relative to FIG. 13, additional instances of the component may be employed. For example, server 1302 may include, or may be incorporated in, more than one server. Similarly, communication network 1314 may include, or may be incorporated in, more than one communication network. Server 1302 is shown communicatively coupled to client device 1318 through communication network 1314. While not shown in FIG. 13, server 1302 may be directly communicatively coupled to client device 1318, for example, in a system absent or bypassing communication network 1314.

Client device 1318 may have stored thereon executable instructions, or a program such as a media asset player configured to carry out the processes as described herein, in particular those described with reference to FIGS. 10, 11, and 12.

Communication network 1314 may comprise one or more network systems, such as, without limitation, an internet, LAN, WIFI or other network systems suitable for video and/or audio processing applications. In some embodiments, system 1300 excludes server 1302, and functionality that would otherwise be implemented by server 1302 is instead implemented by other components of system 1300, such as one or more components of communication network 1314, or entirely by the computing device 1318. In still other embodiments, server 1302 works in conjunction with one or more components of communication network 1314 to implement certain functionality described herein in a distributed or cooperative manner. Similarly, in some embodiments, system 1300 excludes client device 1318, and functionality that would otherwise be implemented by client device 1318 is instead implemented by other components of system 1300, such as one or more components of communication network 1314 or server 1302 or a combination. In still other embodiments, client device 1318 works in conjunction with one or more components of communication network 1314 or server 1302 to implement certain functionality described herein in a distributed or cooperative manner.

Client device 1318 includes control circuitry 1328, display 1334 and input output circuitry 1316. Control circuitry 1328 in turn includes transceiver circuitry 1362, storage 1338 and processing circuitry 1340. In some embodiments, client device 1318 or control circuitry 1328 may be configured as the "user interface" referenced herein.

Server 1302 includes control circuitry 1320 and storage 1324. Each of storages 1324 and 1338 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each storage 1324, 1338 may be used to store various types of content, media data, and or other types of data (e.g., they can be used to store multimedia content such as audio, video and advertisement data). Non-volatile memory may also be used (e.g., to launch a boot-up routine and other instructions). Cloud-based storage may be used to supplement storages 1324, 1338 or instead of storages 1324, 1338. In some embodiments, pre-encoded or encoded multimedia content, in accordance with the present disclosure, may be stored on one or more of storages 1324, 1338.

In some embodiments, control circuitry 1320 and/or 1328 executes instructions for an application stored on memory (e.g., storage 1324 and/or storage 1338). Specifically, control circuitry 1320 and/or 1328 may be instructed by the application to perform the functions discussed herein. In some implementations, any action performed by control circuitry 1320 and/or 1328 may be based on instructions received from the application. For example, the application may be implemented as software or a set of executable instructions that may be stored on storage 1324 and/or 1338 and executed by control circuitry 1320 and/or 1328. In some embodiments, the application may be a client/server application where only a client application resides on client device 1318, and a server application resides on server 1302.

The application may be implemented using any suitable architecture. For example, it may be a stand-alone application wholly implemented on client device 1318. In such an approach, instructions for the application are stored locally (e.g., in storage 1338), and data for use by the application is downloaded on a periodic basis (e.g., from an out-of-band feed, from an internet resource, or using another suitable approach). Control circuitry 1328 may retrieve instructions for the application from storage 1338 and process the instructions to perform the functionality described herein. Based on the processed instructions, control circuitry 1328 may determine a type of action to perform in response to input received from input/output path (or input output circuitry) 1316 or from communication network 1314.

In client/server-based embodiments, control circuitry 1328 may include communication circuitry suitable for communicating with an application server (e.g., server 1302) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the internet or any other suitable communication networks or paths (e.g., communication network 1314). In another example of a client/server based application, control circuitry 1328 runs a web browser that interprets web pages provided by a remote server (e.g., server 1302). For example, the remote server may store the instructions for the application in a storage device. The remote server may process the stored instructions using circuitry (e.g., control circuitry 1328) and/or generate displays. Client device 1318 may receive the displays generated by the remote server and may display the content of the displays locally via display 1334. This way, the processing of the instructions is performed remotely (e.g., by server 1302) while the resulting displays, such as the displays described elsewhere herein, are provided locally on client device 1318. Client device 1318 may receive inputs from the user via input circuitry 1316 and transmit those inputs to the remote server for processing and generating the corresponding displays. Alternatively, client device 1318 may receive inputs from the user via input circuitry 1316 and process and display the received inputs locally, by control circuitry 1328 and display 1334, respectively.

Server 1302 and client device 1318 may transmit and receive content and data such as media content via communication network 1314. For example, server 1302 may be a media content provider, and client device 1318 may be a smart television configured to download or stream media content from server 1302. Control circuitry 1320, 1328 may send and receive commands, requests, and other suitable data through communication network 1314 using transceiver circuitry 1360, 1362, respectively. Control circuitry 1320, 1328 may communicate directly with each other using transceiver circuitry 1360, 1362, respectively, avoiding communication network 1314.

It is understood that client device 1318 is not limited to the embodiments and methods shown and described herein. In nonlimiting examples, client device 1318 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, client equipment, or wireless device, and/or combination of the same capable of suitably displaying and manipulating media content.

Control circuitry 1320 and/or 1318 may be based on any suitable processing circuitry such as processing circuitry 1326 and/or 1340, respectively. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor). In some embodiments, control circuitry 1320 and/or control circuitry 1318 are configured to implement a media content operation system, such as systems, or parts thereof, that perform various actions and processes described herein.

Client device 1318 receives a user input or user interface input 1304 at input circuitry 1316. For example, client device 1318 may receive a user interface input like a tap, click, swipe, or gesture, as discussed above.

User interface input 1304 may be received from a user input device (not shown) that is separate from device 1318, such as a remote-control device, game controller, trackpad or any other suitable user movement sensitive or capture devices, or as part of device 1318, such as a touchscreen of display 1334. Transmission of user interface input 1304 to client device 1318 may be accomplished using a wired connection, such as an audio cable, USB cable, ethernet cable or the like attached to a corresponding input port at a local device, or may be accomplished using a wireless connection, such as BLUETOOTH, Wi-Fi, WiMAX, ZIG-BEE, GSM, UTMS, CDMA, TDMA, 3G, 4G, 4G LTE, or any other suitable wireless transmission protocol. Input circuitry 1316 may comprise a physical input port such as a 3.5 mm audio jack, RCA audio jack, USB port, ethernet port, or any other suitable connection for receiving audio over a wired connection, or may comprise a wireless receiver configured to receive data via BLUETOOTH, Wi-Fi, WiMAX, ZIGBEE, GSM, UTMS, CDMA, TDMA, 3G, 4G, 4G LTE, or other wireless transmission protocols.

Processing circuitry 1340 may receive input 1304 from input circuit 1316. Processing circuitry 1340 may convert or translate the received user input 1304 that may be in the form of gestures or movement to digital signals. In some embodiments, input circuit 1316 performs the translation to digital signals. In some embodiments, processing circuitry 1340 (or processing circuitry 1326, as the case may be) carries out disclosed processes and methods.

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

For the avoidance of doubt, the systems and methods provided herein apply equally to subtitles, captions, credits, and any other text overlaid on a video or embedded in a video. For example, in some jurisdictions the term subtitles is taken to mean a textual description that is used when the viewer can hear but cannot understand the language or accent, or the speech is not entirely clear, and so subtitles may transcribe only dialogue and some on-screen text. Captions may aim to describe to the deaf and hard of hearing all significant audio content, such as spoken dialogue and non-speech information such as the identity of speakers and, occasionally, their manner of speaking, along with any significant music or sound effects using words or symbols. However, in other jurisdictions, the term subtitles does not distinguish between subtitles and captions. Thus, for the sake of brevity throughout the following disclosure, the term "text" will be used to mean subtitles and/or captions, as well as the credits that are embedded within the video.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

The reader's attention is directed to all papers and documents which are filed concurrently with or previous to this specification in connection with this application and which are open to public inspection with this specification, and the contents of all such papers and documents are incorporated herein by reference.

What is claimed is:

1. A method for media navigation comprising:
generating for display a video;
generating for display at least one line of text overlaid over the video;
in response to receiving a first directional swipe in a first direction and having a first speed, for at least a portion of the at least one line of text:

modifying a play position of the video in a first manner based on the first direction and the first speed of the first directional swipe for the at least a portion of the at least one line of text; and modifying the display of the at least one line of text overlaid over the video based on the first direction and the first speed of the first directional swipe; and in response to receiving a selection of a specific portion of text of the at least one line of text overlaid over the video:

identifying from the video a plurality of scenes related to the specific portion of text; and providing a plurality of selectable options corresponding to the plurality of scenes wherein a selection of a respective selectable option causes a respective scene to be generated for display; and in response to receiving a second directional swipe in a second direction orthogonal to the first direction and having a second speed, for at least a portion of the at least one line of text:

modifying the play position of the video in a second manner based on the second direction and the second speed of the second directional swipe for the at least a portion of the at least one line of text; and modifying the display of the at least one line of text overlaid over the video based on the second direction and the second speed of the second directional swipe.

2. The method of claim 1, wherein modifying the play position of the video in the first manner comprises modifying the play position at a rate proportional to the first speed of the first directional swipe, and wherein modifying the play position of the video in the second manner comprises modifying the play position at a rate proportional to the second speed of the second directional swipe.

3. The method of claim 1, further comprising:

in response to receiving a directional swipe comprising a selection and upward drag of the at least a portion of the at least one line of text, modifying the play position of the video forward proportional to a speed of the upward drag; and in response to receiving a directional swipe comprising a selection and downward drag of the at least a portion of the at least one line of text, modifying the play position of the video backward proportional to a speed of the downward drag.

4. The method of claim 3, wherein the directional swipe is received via a touch screen, and wherein the selection and upward drag comprises a tap and swipe.

5. The method of claim 1, further comprising:

generating for display a plurality of lines of text overlaid over the video;

generating for display a current line of text that corresponds to a current video segment in a middle position, wherein the current line of text is visually different from adjacent lines of text;

generating for display a first adjacent line of text that corresponds to an adjacent preceding video segment above the middle position; and generating for display a second adjacent line of text that corresponds to an adjacent following video segment below the middle position.

6. The method of claim 1, further comprising:

in response to receiving a selection of a selected line of text of the at least one line of text overlaid over the video, modifying the play position of the video to a video segment corresponding to the selected line of text.

7. The method of claim 1, wherein the at least one line of text overlaid over the video comprises a first page of text generated for display in a page format and comprising a plurality of lines of text, the method further comprising:

in response to receiving the first directional swipe in the first direction and having the first speed, for at least a portion of the first page of text:

generating for display a second page of text comprising a second plurality of lines of text; and modifying the play position of the video in the first manner to a first video segment corresponding to a first line of text of the second plurality of lines of text of the second page of text; and in response to receiving the second directional swipe in the second direction orthogonal to the first direction and having the second speed, for at least a portion of the first page of text:

generating for display a third page of text comprising a third plurality of lines of text; and modifying the play position of the video in the second manner to a second video segment corresponding to the first line of text of the third plurality of lines of text of the third page of text.

8. The method of claim 1, further comprising:

generating for display credits corresponding to the video; and in response to receiving a user interface input selecting a selected portion of the credits:

generating for display an indication of one or more video segments that correspond to the selected portion of the credits;

loading the one or more video segments of the video that correspond to the selected portion of the credits; and setting a current play position of the video to a first video segment of the one or more video segments that correspond to the selected portion of the credits.

9. The method of claim 1, further comprising:

generating for display song information for one or more songs played during the video; and in response to receiving a user interface input selecting a selected portion of the song information:

generating for display an indication of one or more video segments that correspond to the selected portion of the song information; and causing an audio output of audio corresponding to the selected portion of the song information.

10. A system for media navigation comprising:

input/output circuitry configured to:

generate for display a video; and generate for display at least one line of text overlaid over the video; and control circuitry configured to:

in response to receiving a first directional swipe in a first direction and having a first speed, for at least a portion of the at least one line of text:

modify a play position of the video in a first manner based on the first direction and the first speed of the first directional swipe for the at least a portion of the at least one line of text; and modify the display of the at least one line of text overlaid over the video based on the first direction and the first speed of the first directional swipe; and in response to receiving a selection of a specific portion of text of the at least one line of text overlaid over the video:

identify from the video a plurality of scenes related to the specific portion of text; and provide a plurality of selectable options corresponding to the plurality of scenes wherein a selection of a respective selectable option causes a respective scene to be generated for display; and in response to receiving a second directional swipe in a second direction orthogonal to the first direction and having a second speed, for at least a portion of the at least one line of text:

modify the play position of the video in a second manner based on the second direction and the second speed of the second directional swipe for the at least a portion of the at least one line of text; and modify the display of the at least one line of text overlaid over the video based on the second direction and the second speed of the second directional swipe.

11. The system of claim 10, wherein the control circuitry is configured to modify the play position of the video in the first manner at a rate proportional to the first speed of the first directional swipe, and wherein the control circuitry is configured to modify the play position of the video in the second manner at a rate proportional to the second speed of the second directional swipe.

12. The system of claim 10, wherein the control circuitry is further configured to:

in response to receiving a directional swipe comprising a selection and upward drag of the at least a portion of the at least one line of text, modify the play position of the video forward proportional to a speed of the upward drag; and in response to receiving a directional swipe comprising a selection and downward drag of the at least a portion of the at least one line of text, modify the play position of the video backward proportional to a speed of the downward drag.

13. The system of claim 12, wherein the directional swipe is received via a touch screen, and wherein the selection and upward drag comprises a tap and swipe.

14. The system of claim 10, wherein the input/output circuitry is further configured to:

generate for display a plurality of lines of text overlaid over the video;

generate for display a current line of text that corresponds to a current video segment in a middle position, wherein the current line of text is visually different from adjacent lines of text;

generate for display a first adjacent line of text that corresponds to an adjacent preceding video segment above the middle position; and generate for display a second adjacent line of text that corresponds to an adjacent following video segment below the middle position.

15. The system of claim 10, wherein the control circuitry is further configured to:

in response to receiving a selection of a selected line of text of the at least one line of text overlaid over the video, modify the play position of the video to a video segment corresponding to the selected line of text.

16. The system of claim 10, wherein the at least one line of text overlaid over the video comprises a first page of text generated for display in a page format and comprising a plurality of lines of text, wherein the control circuitry is further configured to:

in response to receiving a directional user interface input for at least a portion of the first page of text:

generate for display a second page of text comprising a second plurality of lines of text; and modify the play position of the video to a video segment corresponding to a first line of text of the second plurality of lines of text of the second page of text.

17. The system of claim 10, wherein the control circuitry is further configured to:

in response to receiving a user interface input selecting a selected portion of the at least one line of text overlaid over the video:

generate for display an indication of one or more video segments of the video corresponding to the selected portion of the at least one line of text;

load the one or more video segments of the video; and generate for display, the one or more video segments of the video.

* * * * *